(12) United States Patent
Guin et al.

(10) Patent No.: US 11,142,696 B2
(45) Date of Patent: Oct. 12, 2021

(54) PROGRAMMABLE NANOCOMPOSITES

(71) Applicant: Government of the United States as represented by the Secretary of the Air Force, Wright-Patterson AFB, OH (US)

(72) Inventors: Tyler C Guin, Aiken, SC (US); Timothy J. White, Longmount, CO (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/373,110

(22) Filed: Apr. 2, 2019

(65) Prior Publication Data
US 2019/0300792 A1    Oct. 3, 2019

Related U.S. Application Data

(60) Provisional application No. 62/651,667, filed on Apr. 2, 2018.

(51) Int. Cl.
*C09K 19/38* (2006.01)
*C09K 19/56* (2006.01)

(52) U.S. Cl.
CPC .......... *C09K 19/3852* (2013.01); *C09K 19/56* (2013.01)

(58) Field of Classification Search
CPC .............. C09K 19/56; C09K 2019/521; C01B 2202/08
See application file for complete search history.

(56) References Cited

U.S. PATENT DOCUMENTS

| | | |
|---|---|---|
| 5,863,457 A | 1/1999 | Hasebe et al. |
| 6,312,770 B1 | 11/2001 | Sage et al. |
| 7,936,404 B2 | 5/2011 | Spillmann et al. |
| 9,902,906 B2 | 2/2018 | White et al. |
| 2011/0049768 A1 | 3/2011 | Hu et al. |
| 2018/0208847 A1 | 7/2018 | White et al. |

OTHER PUBLICATIONS

Yu et al., Angew. Chem. Int. Ed. 2007, 46, 881-883 (Year: 2007).*
Torras et al., J. Mater. Chem. C, 2013, 1, 5183-5190. (Year: 2013).*
White, T. J. et al. "Programmable and adaptive mechanics with liquid crystal polymer networks and elastomers." Nat. Mater. 14, 1087-1098 (2015). (Year: 2015).*

(Continued)

*Primary Examiner* — Chanceity N Robinson
(74) *Attorney, Agent, or Firm* — AFMCLO/JAZ; Chastity D. S. Whitaker

(57) ABSTRACT

A shape-programmable liquid crystal elastomer. The elastomer comprising cross-linked and polymerized nematic, isotropic monomers with carbon nanotubes that are organized into a plurality of voxels. Each voxel has a director orientation such that each voxel of the plurality has a first state according to the director orientation and a second state according to cross-linkages of the polymerized nematic monomers. The elastomer transitions between the first and second states with exposure to an electric field.

15 Claims, 25 Drawing Sheets
(17 of 25 Drawing Sheet(s) Filed in Color)

(56) References Cited

OTHER PUBLICATIONS

United States Patent and Trademark Office, Non-Final Office Action in U.S. Appl. No. 15/877,533, dated Nov. 20, 2019, 6 pages total.

N. Torras et al., "Liquid-crystalline elastomer micropillar array for haptic actuation," J. Mater. Chem. C, vol. 1 (2013) 5183-5190.

Y Yu et al., "Photomechanical effects of ferroelectric liquid-crystalline elastomers containing azobenzene chromophores," Angewandte Chemie, vol. 46 (2007) 881-883.

United States Patent and Trademark Office, Office Action in U.S. Appl. No. 15/135,108, dated Sep. 20, 2019, 7 pages total.

S. Courty et al., "Nematic elastomers with aligned carbon nanotubes: new electromechanical actuators," Europhysics Letters, vol. 64 (2003) 654-660.

T. H. Ware et al., "Voxelated liquid crystal elastomers," Science, vol. 374 (2015) 982-984.

T. Okamoto et al., "Large electromechanical effect of isotropic-genesis polydomain nematic elastomers," Soft Matter, vol. 7 (2011) 10585-10589.

C. M. Spillmann et al., "Aniostropic actuation in electroclinic liquid crystal elastomers," Applied Physics Letters, vol. 90 (2007) 021911-1 to -3.

I Dierking et al., "Liquid crystal-carbon nanotube dispersions," Journal of Applied Physics, vol. 97 (2005) 044309-1 to -5.

M. D. Lynch et al., "Organizing carbon nanotubes with liquid crystals," NanoLetters, vol. 2 (2002) 1197-1201.

M. E. McConney et al., "Topography from topology: photoinduced surface features generated in liquid crystal polymer networks," Advanced Materials, vol. 25 (2013) 5880-5885.

S-K Ahn et al., "Photoindcued topographical feature development in blueprinted azobenzene-functionalized liquid crystalline elastomers," Advanced Functional Materials, vol. 26 (2016) 5819-5826.

P. Papadopoulos et al., "Electromechanical properties of smectice C* liquid crystal elastomers under shear," Macromolecules, vol. 43 (2010) 6666-6670.

T. H. Ware et al., "Programmable liquid crystal elastomers prepared by thiol-ene photopolymerization," ACS Macro Lett, vol. 4 (2015) 942-946.

T. J. White et al., "Programmable and adapttive mecahnics with liquid crystal polymer networks and elastomers," Nature Materials, vol. 14 (2015) 1087-1098.

B. A. Kowalski et al., "Pixelated polymers: directed self assembly of liquid crystalline polymer networks," ACS MacroLetters, vol. 6 (2017) 436-441.

* cited by examiner

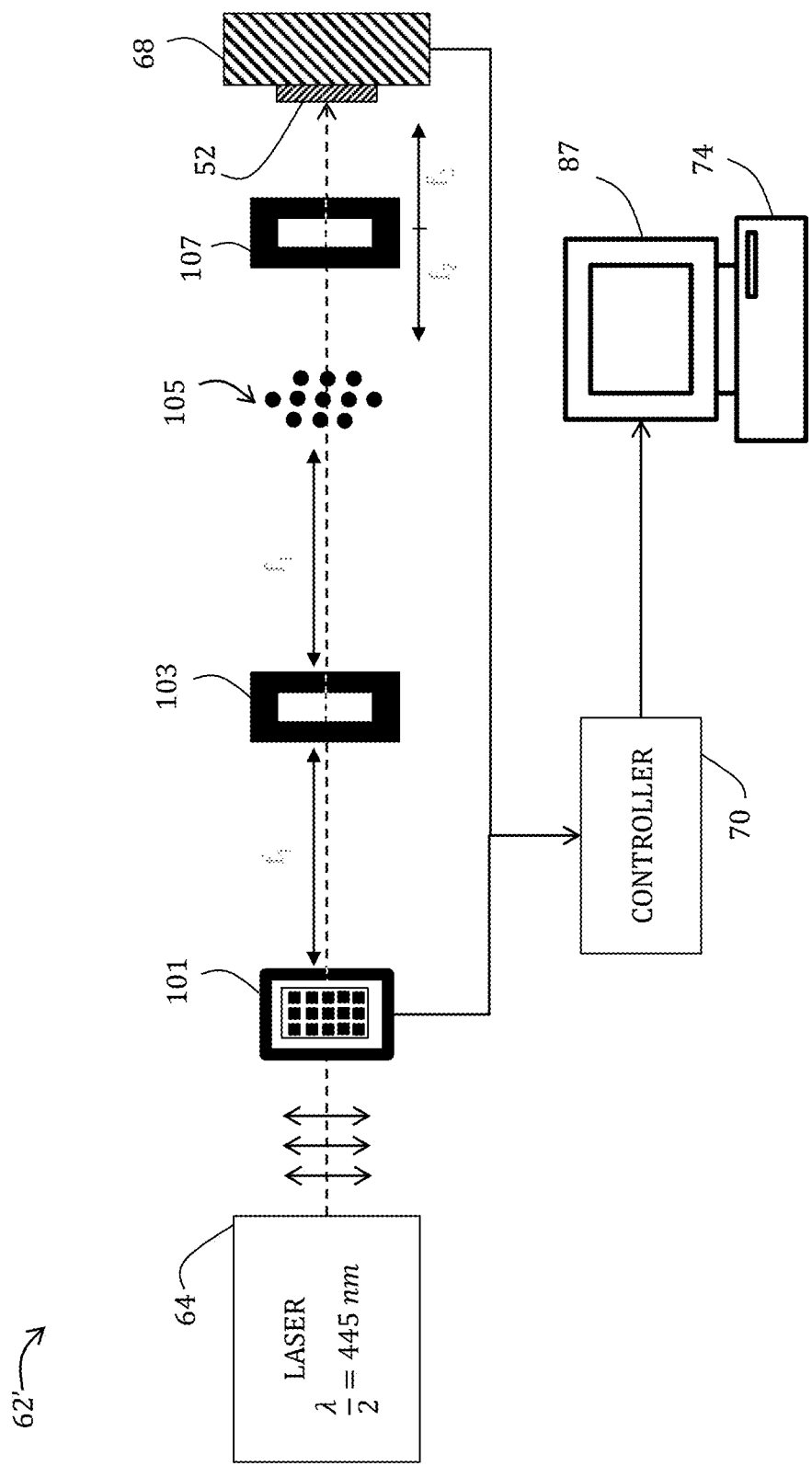

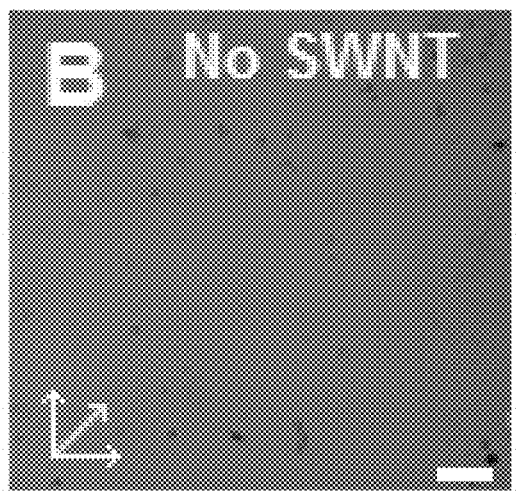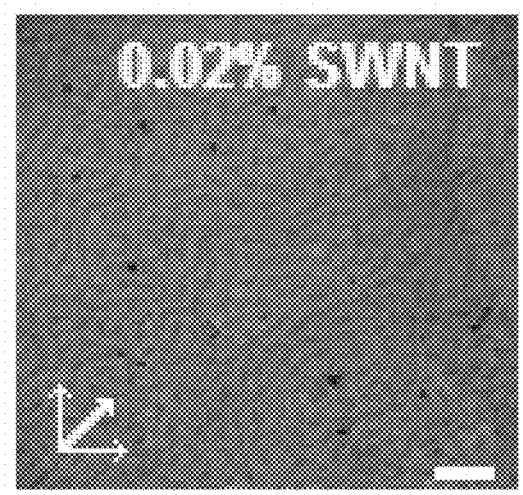
FIG. 8A  FIG. 8B
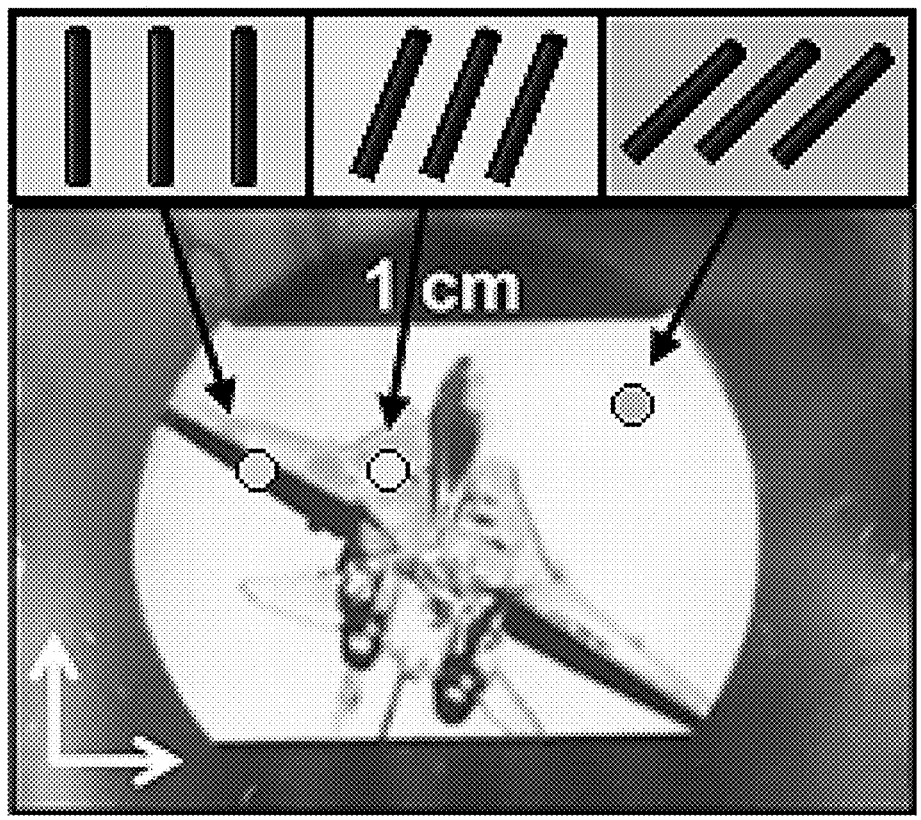
FIG. 10

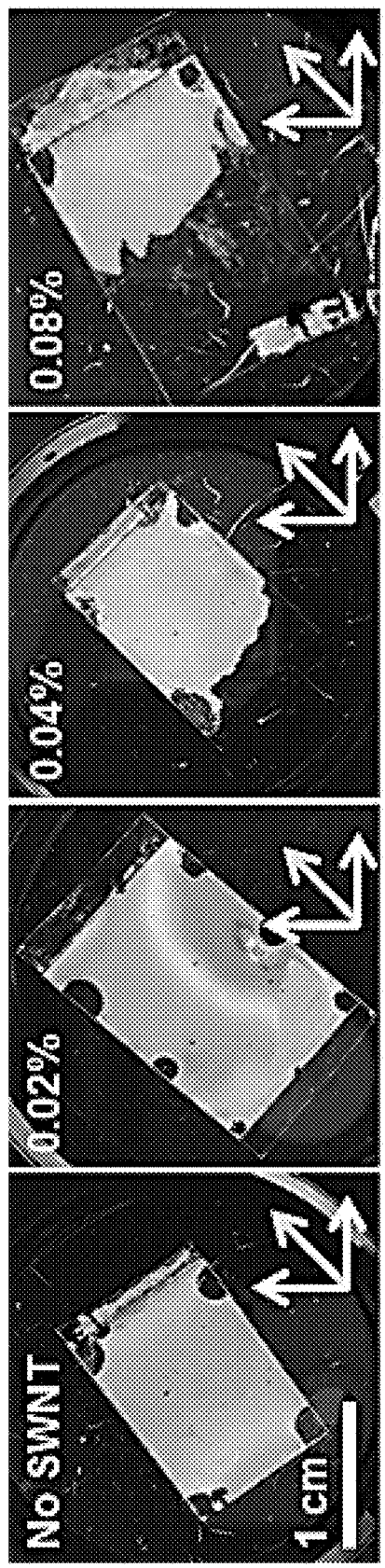

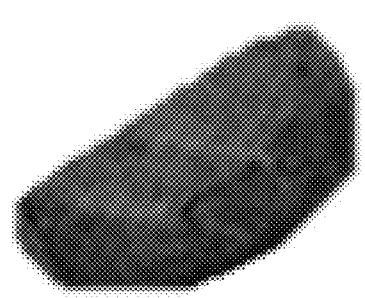 
FIG. 22A  FIG. 22B
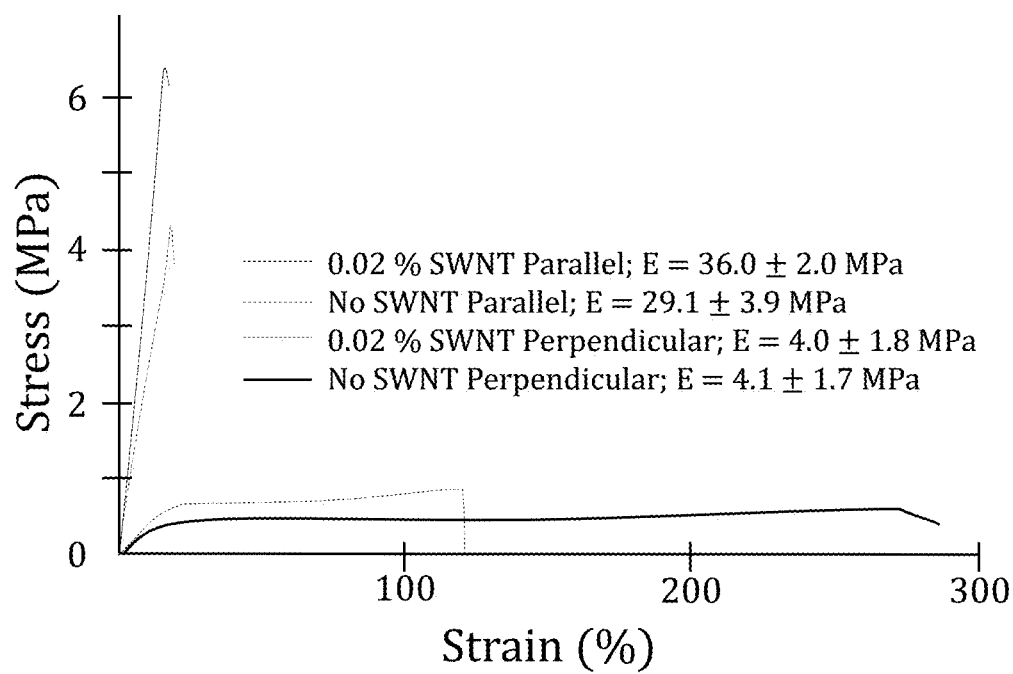
FIG. 23

PROGRAMMABLE NANOCOMPOSITES

Pursuant to 37 C.F.R. § 1.78(a)(4), this application claims the benefit of and priority to prior filed Provisional Application Ser. No. 62/651,667, filed Apr. 2, 2018, which is expressly incorporated herein by reference in its entirety.

RIGHTS OF THE GOVERNMENT

The invention described herein may be manufactured and used by or for the Government of the United States for all governmental purposes without the payment of any royalty.

FIELD OF THE INVENTION

The present invention relates generally to liquid crystal polymer nanocomposites and, more particularly, to programmable liquid crystal polymer nanocomposites.

BACKGROUND OF THE INVENTION

One-dimensional, high aspect ratio nanomaterials, such as carbon nanotubes ("CNTs") possess unique anisotropic electrical, photonic, and mechanical properties. The addition of these materials into polymer matrices yields composites that assimilate the processing and durability of polymers with the distinctive properties (such as superior electrical or thermal conductivity or mechanical reinforcement) of the nanoinclusion (that is, the incorporated CNT). Enforcing alignment upon the nanoinclusion can further enhance the properties of the nanocomposite by facilitating cooperative interactions.

The facile preparation and alignment of nanoinclusions in polymer nanocomposites is complicated by entropy, which is minimized in the disordered state. A number of techniques have been explored to orient one-dimensional nanomaterials. The most common of these conventional methods has been extrusion, which aligns the nanomaterial through rheological forces. This approach, along with other methods that rely on mechanical forces or external fields, is limited to uniaxial alignment without spatial control of the local order.

Liquid crystalline ("LC") materials are inherently anisotropic and benefit from cooperative interactions when aligned. LCs are typified by long-range order (orientation), which may be locally controlled through electric fields, magnetic fields, or surface alignment. In fact, liquid crystallinity may be retained in various polymeric forms.

Arbitrary and complex control of the local orientation of the LC director within LCEs (LC elastomers) has been demonstrated, such as in White et al., U.S. Pat. No. 9,902,906, issued Feb. 27, 2018, the disclosure of which is incorporated herein by reference, in its entirety). For example, localized irradiation of LCE photoalignment surfaces direct the self-assembly of liquid crystal monomers to yield a voxelated (3-dimensionally pixelated) LCE upon polymerization. The localization of the mechanical response of the materials enables stimuli-responsive transformation from 2-D flat sheets to 3-D shapes.

Recently there has been interest in exploring shape programming in LCEs that mechanically respond to thermally or photo-induced stimuli. A number of examinations of electrically induced mechanical responses of polymer nanocomposites have employed resistive heating. Comparatively few reports detail direct electromechanical transduction. Most compelling of these results are electromechanical effects observed in tilted smectic LCEs, where the mesogen unit of the LCE is free to rotate in an electric field, resulting in macroscopic shear. However, smectic LCEs, despite displaying impressive reversible strains (greater than 8%), are not amenable to command surfaces and, therefore, are not applicable to topologically complex director orientations.

Shape programming in LCEs may transform the flat sheets into pre-determined shapes when exposed to heat, solvent, or light. These stimuli disrupt the order of the liquid crystalline material and produce spontaneous and anisotropic dimensional changes that are defined by the director orientation. Many potential end use applications of these materials as actuators require response times not yet achievable with heat or light stimuli. For this and other reasons, electric fields have long been acknowledged as a desirable stimulus to trigger shape change or actuation.

Nematic LCEs have also been mildly sensitized to electrical control (less than 4.5 kPa blocking force) by incorporating a small volume fraction of CNTs (that is, far below the percolation threshold). However, these conventional approaches rely on uniaxial mechanical stretching to induce alignment of both the LCE and the nanomaterial. Such uniaxial mechanical stretching prevents utility as a pixelated LCE. Ideally, an electrically-stimulated nanocomposite LCE would be conducive to surface alignment via photopatterning and able to be processed as a one-pot reaction to facilitate classical LC processing techniques.

Therefore, there remains a need for electrical control of topologically imprinted LCEs, which could enable device implementations primarily associated with swifter response times.

SUMMARY OF THE INVENTION

The present invention overcomes the foregoing problems and other shortcomings, drawbacks, and challenges of topologically imprinted LCEs that enable electrical control. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a shape-programmable LCE includes cross-linked and polymerized nematic, isotropic monomers with carbon nanotubes ("CNTs") organized into a plurality of voxels. Each voxel has a director orientation such that each voxel of the plurality has a first state according to the director orientation and a second state according to cross-linkages of the polymerized nematic monomers. The elastomer transitions between the first and second states with exposure to an electric field.

As to these embodiments, the composition of liquid crystalline and isotropic monomers, when polymerized, form liquid crystalline polymer networks and elastomers. The composition is subject to surface-enforced alignment to program orientation in discrete volume elements (e.g., voxels). Inclusion of CNTs sensitizes the polymer nanocomposite to electric fields. The association of the stimulus response and orientation of the voxel yields directional strain.

Other embodiments of the present invention include a liquid crystal film comprising the shape-programmable liquid crystal elastomer and a topographical defect. The topographical defect has first and second states and is configured such that the first state is assumed with the presence of the electric field and the second state is assumed with the absence of the electric field.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 3 and 3A are alternative, schematic views of exemplary systems for conducting a portion of the method of FIG. 1.

FIGS. 8A and 8B are polarized optical micrographs of 15 μm thick films prepared in accordance with an embodiment of the present invention.

FIGS. 9A-9D are cross-polarized images of 8 μm thick films of varying SWNT content filling a cell at 100° C.

FIG. 10 is a photograph of a 12 μm thick film prepared in accordance with an embodiment of the present invention having the image of an aircraft embedded therein.

FIGS. 22A and 22B are cross-polarized pictures of films graphically illustrated in FIG. 21B.

FIG. 23 graphically illustrates uniaxial tensile testing curves of 15 μm thick films, with and without SWNTs, with accompanying Young's modulus, some films being in accordance with embodiments of the present invention.

Figure 1:
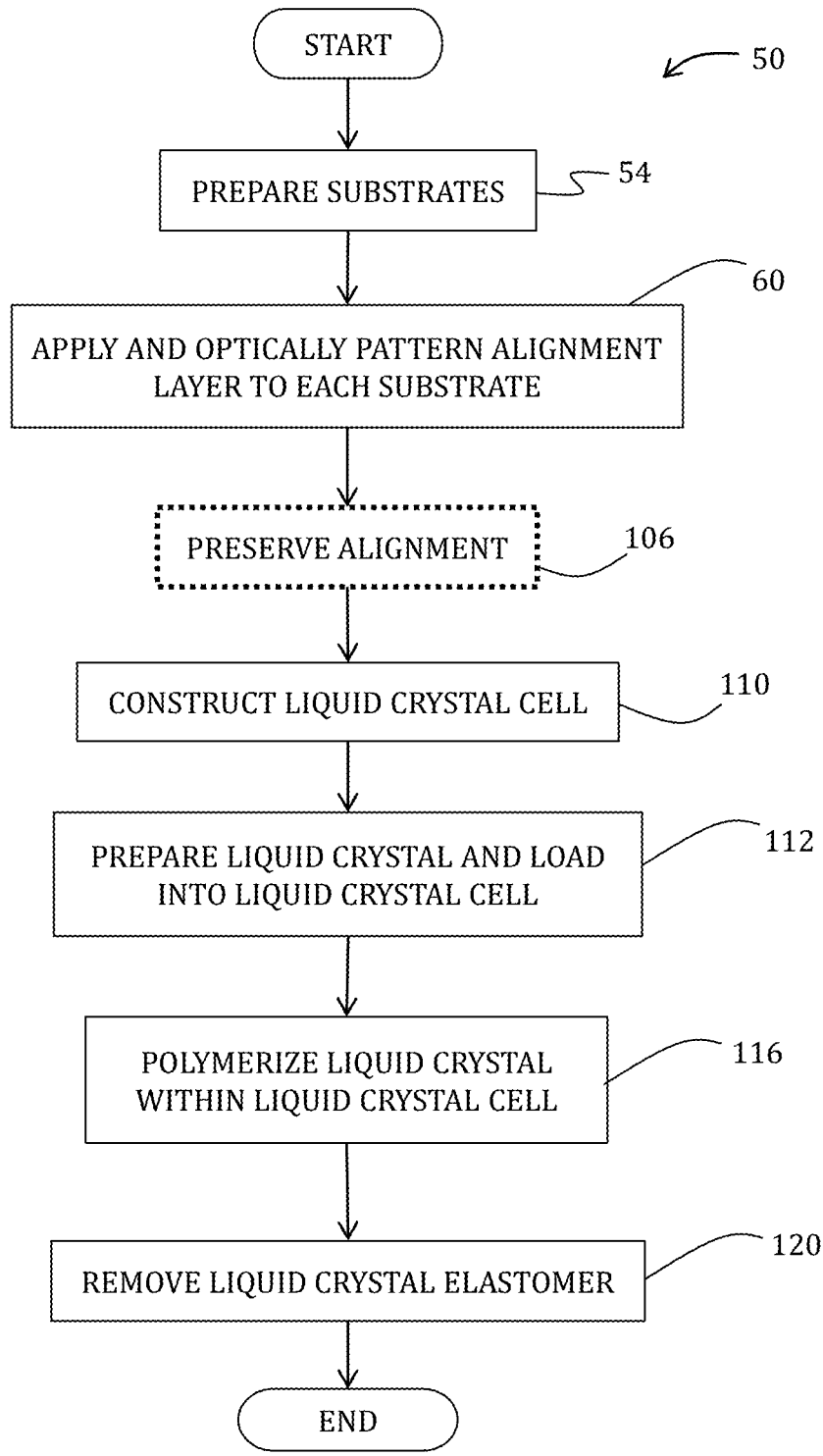
FIG. 1 is a flow chart illustrating a method of preparing elastomers according to embodiments of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Referring now to the figures, methods of preparing and using materials chemistry platforms conducive to the surface-alignment of liquid crystals are shown and described. The sensitivity of the materials chemistry to surface-alignment, specifically, photoalignment surface chemistries, realizes volumetric elements (also known as "voxels") having discrete directors (or domains of similar directors) of aligned liquid crystal elastomer ("LCE") or liquid crystal network ("LCN"). Enabled by the large strain inherent to LCEs, the sensitivity of the material chemistry to surface-alignment, and the optical patterning methods, programmable shape change, and actuation in a monolithic element derived from a variety of complex director profiles can be achieved.

As used herein, "LCEs" are defined by the couple of liquid crystal orientation and viscoelasticity at temperatures below the glass transition. As exemplified herein, the LCEs are evaluated at room temperature.

As used herein, "liquid crystal" or "LC" refers to a state of matter with local or global orientation of the macromolecular units.

As used herein, "mesogen" is a part of a molecule or compound of a liquid crystal that is responsible for the liquid crystal properties.

As used herein, "macromers" are polymerizable molecules formed from a chain-extension reaction of monomer precursors.

As used herein, "director" refers to an average molecular orientation of the mesogens comprising the liquid crystal.

As used herein, "voxel" refers to a discrete, three-dimensional area within a liquid crystal elastomer having a director.

As used herein, "domain" is a generalized volume of material with a uniform liquid crystalline orientation.

As used herein, "acrylates" are salts, esters, and conjugate bases of acrylic acid and its derivatives.

As used herein, "methacrylates" are salts, esters, and conjugate bases of methacrylic acid ("MAA"), $CH_3CH_2CCOOH$, and its derivatives.

As used herein, "thiols" are organosulfur compounds: HSRSH, wherein R may include alkyl chains, such as ethyl, propyl, or butyl groups.

As used herein, "vinyls" are ethenyl functional groups: $—C_2H_3$

As used herein, "epoxides" are cyclic ethers having a three-atom ring: $R^1R^2COCR^3R^4$.

As used herein, "amines" are compounds and functional groups comprising a basic nitrogen atom, e.g., having a lone pair of electrons: $RNH_2$, wherein R may be an alkyl chain, for example, an n-butyl group.

As used herein, "diacrylates" are molecules having two acrylate groups.

As used herein, "nematic" refers to a liquid crystal phase in which the mesogens are oriented in parallel, but not in well-defined planes.

As used herein, a "smectic" refers to a liquid crystal having mesogens oriented in parallel and arranged in well-defined planes.

As used herein, a "chiral phase" refers to a nematic liquid crystal possessing a chiral center between well-defined planes.

As used herein, "defect" refers to a topological pattern of order within a liquid crystal elastomer. Defects may be characterized by strength and charge.

As used herein, "glass transition temperature" or "$T_g$" refers the temperature at which glass transition occurs. "Glass transition," as it is used herein, is a reversible transition of a material from a "glassy" state to an elastomeric state.

As used herein, "carbon nanotubes" or "CNT" refers to tubular-shaped molecular structures comprising carbon rings having a diameter on the order of nanometers and lengths ranging from the order of nanometers to millimeters.

As used herein, "nanotubes" refers to a nanometer-scale tube-like structure conventionally comprising boron, carbon, nitrogen, or other elements or mixtures thereof.

Figure 2:
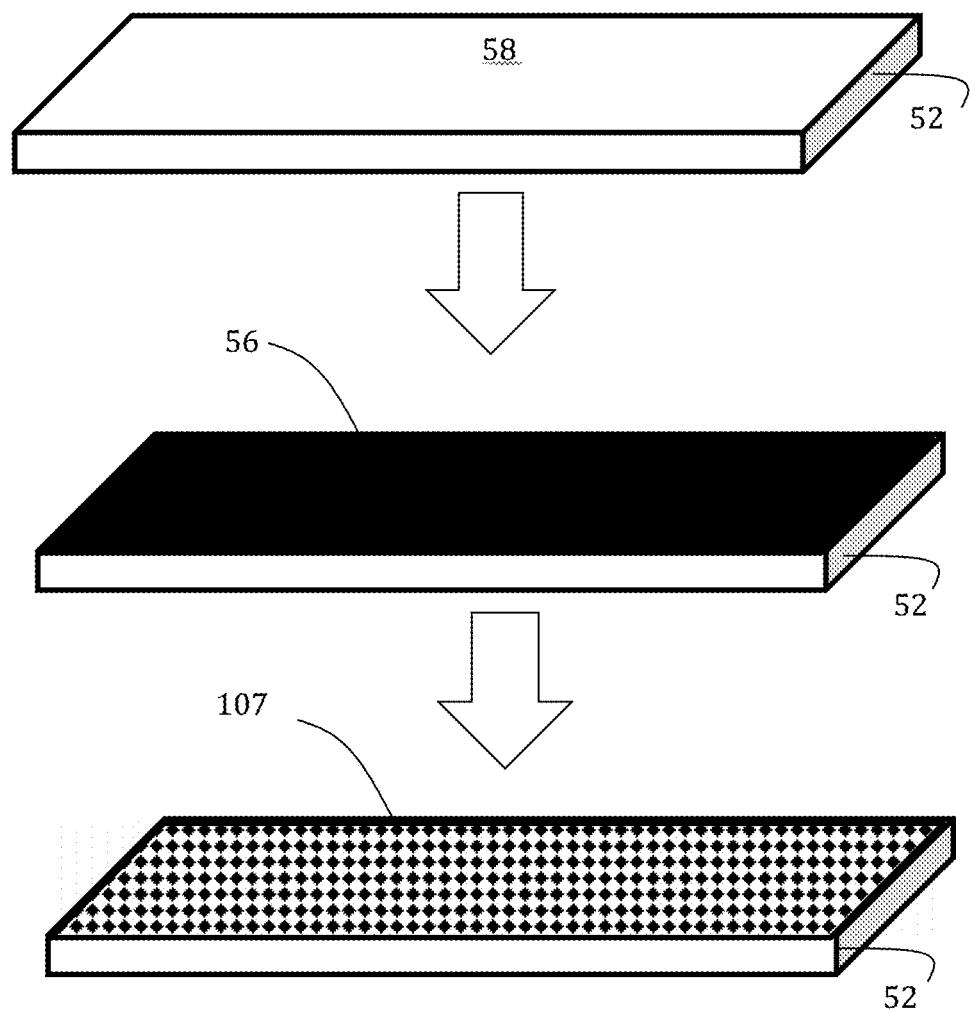
FIG. 2 is perspective view of substrate preparation for use in the method of FIG. 1.

In that regard and with reference now to a method 50 according to an embodiment of the present invention illustrated in FIGS. 1 and 2, a substrate 52 is prepared (Block 54). Preparation of the substrate 52 may include various combinations of cleaning, baking, washing, drying, and so forth, and as would be known by those of ordinary skill in the art. The substrate 52, itself, may comprise glass, poly (ethylene terephthalate), or other inert materials.

An alignment layer 56 may then be applied to a cleaned surface 58 of the substrate 52 (Block 60). The alignment layer 56 generally comprising a chromophore that, when illuminated, behaves as a molecular oscillator until the absorption cross section is minimized with the final orientation being 90° to the electric field vector of the incident light. Said another way, the chromophores of the alignment layer, when exposed to light (such as light emitted from a laser), having particular polarization, amplitude, and phase, may so orient themselves with respect to the surface 58 so as to be orthogonal to the electric field vector of that light. Suitable alignment layer materials may comprise, for example, a photochromic dye, an azobenzene polymer, a stilbene polymer, a linearly polymerizable polymer, or other suitable photosensitive material know to those of ordinary skill in the art of liquid crystal alignment. Application of the alignment layer 56 may include dispersion (such as from a pipette or other like device) or printing, spinning to ensure uniformity, baking to set the alignment layer 56 and remove residual solvent, and so forth.

Figure 3:
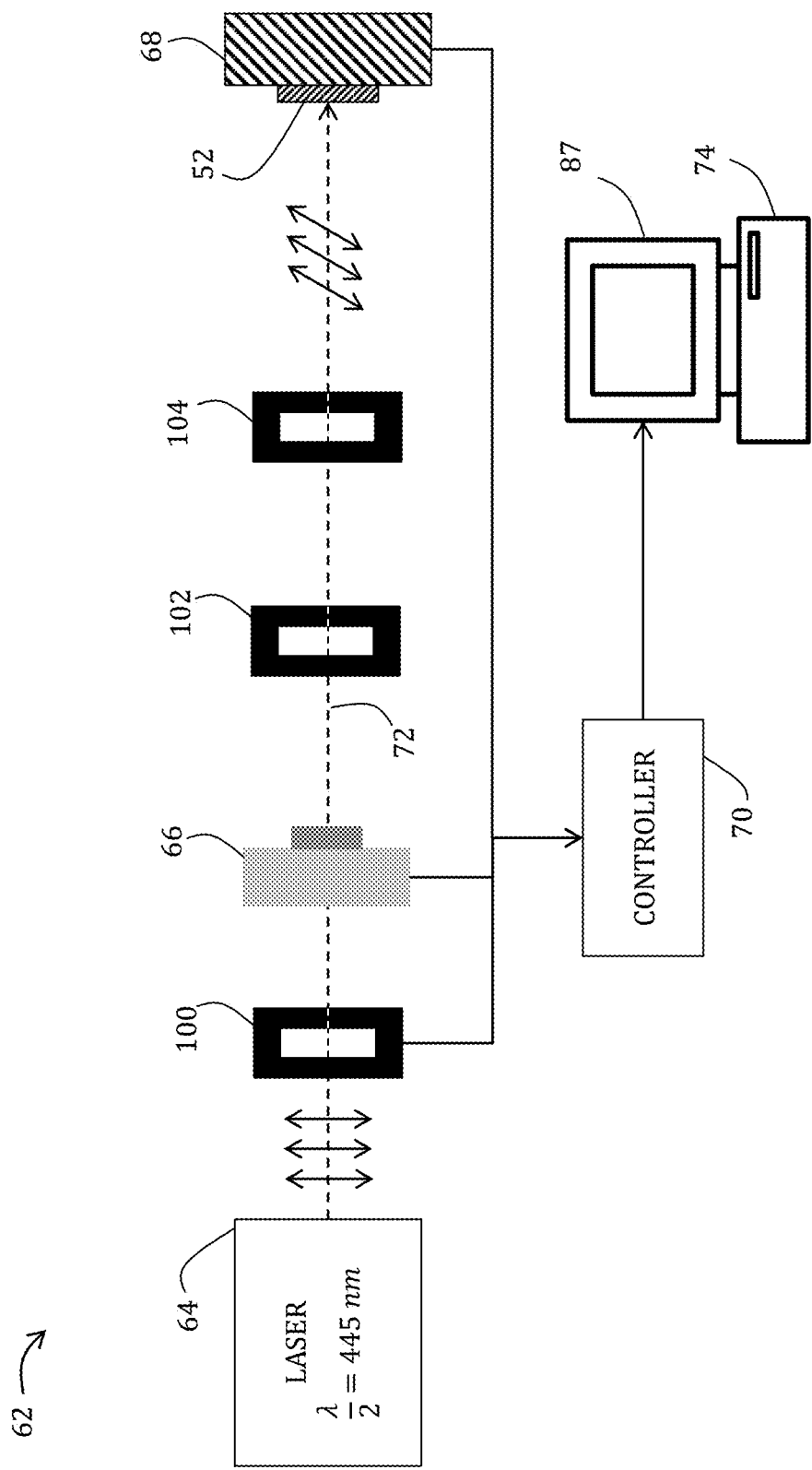

With the alignment layer 56 applied, the alignment layer 56 may then be optically patterned (continuation of Block 60). An exemplary system 62 for optically patterning the alignment layer 56 according to one exemplary method of the present invention is shown in FIG. 3. Generally, the system 62 includes a laser 64 (for example, a 445 nm laser), a moveable waveplate 66, and a moveable substrate support 68. The moveable waveplate 66 is operably coupled to a controller 70, which is configured to move the waveplate 66 with respect to a directionality of the beam 72, which controls a polarization of the light to be used for patterning the alignment layer 56 (FIG. 2). Although not specifically shown, movement of the waveplate 66 may include one or more motors (such as a rotary motor), which may work in concert with movement of the substrate support 68 to dynamically control irradiation over an area as small as 100 $\mu m^2$. The system 62 is configured to manipulate the local surface-alignment of liquid crystalline cells prepared with the alignment layer 56 (FIG. 2).

Figure 4:
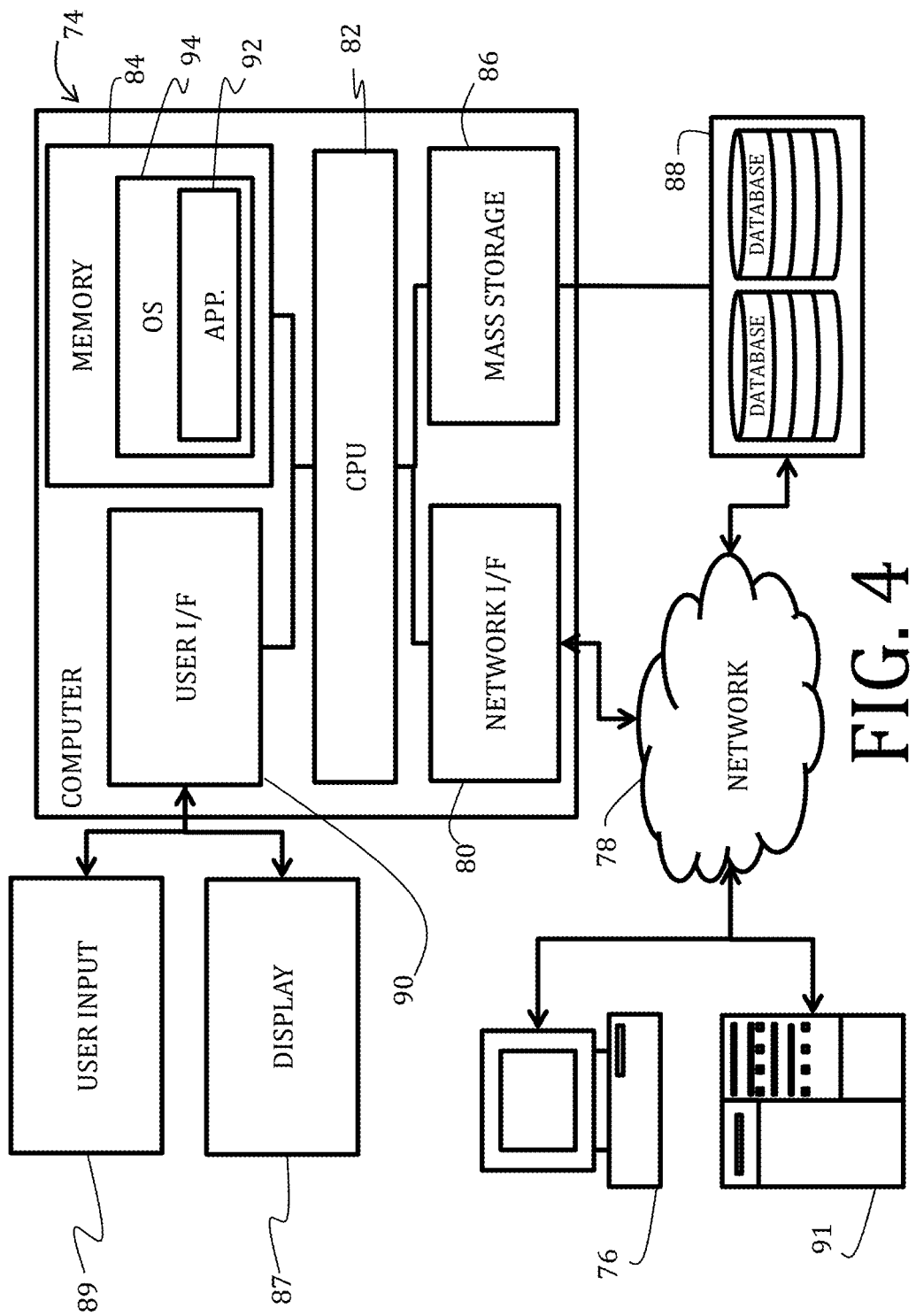
FIG. 4 is a schematic representation of an exemplary computer suitable for conducting a portion of the method of FIG. 1.

The controller 70 is operably coupled to a computer 74, which is described in greater detail with respect to FIG. 4, and which may be considered to represent any type of computer, computer system, computing system, server, disk array, or programmable device such as multi-user computers, single-user computers, handheld devices, networked devices, or embedded devices, etc. The computer 74 may be implemented with one or more networked computers 76 using one or more networks 78, e.g., in a cluster or other distributed computing system through a network interface 80 (illustrated as "NETWORK I/F"). The computer 74 will be referred to as "computer" for brevity's sake, although it should be appreciated that the term "computing system" may also include other suitable programmable electronic devices consistent with embodiments of the invention.

The computer 74 typically includes at least one central processing unit 82 (illustrated as "CPU") coupled to a memory 84 along with several different types of peripheral devices, e.g., a mass storage device 86 with one or more databases 88, an input/output interface 90 (illustrated as "I/O I/F" with associated display 87 and user input device 89), and the Network I/F 80. The memory 84 may include dynamic random access memory ("DRAM"), static random access memory ("SRAM"), non-volatile random access memory ("NVRAM"), persistent memory, flash memory, at least one hard disk drive, and/or another digital storage medium. The mass storage device 86 is typically at least one hard disk drive and may be located externally to the computer 74, such as in a separate enclosure or in one or more networked computers 76, one or more networked storage devices (including, for example, a tape or optical drive), and/or one or more other networked devices 91 (including, for example, a server).

The CPU 82 may be, in various embodiments, a single-thread, multi-threaded, multi-core, and/or multi-element processing unit (not shown) as is well known in the art. In alternative embodiments, the computer 74 may include a plurality of processing units that may include single-thread processing units, multi-threaded processing units, multi-core processing units, multi-element processing units, and/or combinations thereof as is well known in the art. Similarly, the memory 84 may include one or more levels of data, instruction, and/or combination caches, with caches serving the individual processing unit or multiple processing units (not shown) as is well known in the art.

The memory 84 of the computer 74 may include one or more applications 92 (illustrated as "APP."), or other software program, which are configured to execute in combination with the Operating System 94 (illustrated as "OS") and automatically perform tasks necessary for operating the transducers and/or reconstructing the images with or without accessing further information or data from the database(s) 88 of the mass storage device 86.

Those skilled in the art will recognize that the environment illustrated in FIG. 4 is not intended to limit the present invention. Indeed, those skilled in the art will recognize that other alternative hardware and/or software environments may be used without departing from the scope of the invention.

Referring again to FIG. 3, the system 62 may further comprise a shutter 100, a collimator 102, and a lens 104. Altogether, the system 62 operates to focus the laser beam 72 onto each point on the alignment layer 56 (FIG. 2) of the substrate 52 having a desired polarization. Linear polarization angles from about 0° to about 180° with respect to the beam propagation direction may be achieved. Exposure dosage is controlled through the shutter and power of the laser. Dose is dependent on the alignment layer, for example, for azobenzene dyes the exposure energy may be 0.1 J/cm$^2$ and higher.

As shown, the system 62 may be configured to provide a focal spot having a maximum dimensions ranging from nanometer scales to meter scales. More particularly, a maximum dimension of about 100 μm may be easily achieved. As such, a 200×200 pixelated square area (comprising 40,000 pixels, 4 cm$^2$), each pixel being 100 μm, and presuming a 10 msec exposure time per pixel, may take approximately 80 min to pattern.

Alternatively, and as is shown in FIG. 3A, a system 62' is shown and is similar to the system 62 of FIG. 3. In the illustrated system 62', a spatial light modulator 101 replaces the waveplate 66 (FIG. 3). The spatial light modulator 101 imposes a spatial modulation pattern onto light from the laser 64 by altering at least one of amplitude, phase, or polarization of the light. The modulated light may be focused by a first lens 103 to form a Fourier transform at a plane 105. A second lens 107 focuses the Fourier transform at the plane 105 to the image to be patterned. According to an exemplary embodiment, using the spatial light modulation system 62' enables simultaneous writing of 800×600 independent polarizations.

Using the spatial light modulation system 62' of FIG. 3A, it is possible to pattern 10$^6$ pixels, for example, with 15 μm resolution in about 1 second per square centimeter. As such, the spatial light modulation system 62' of FIG. 3A, as compared to the pixel-by-pixel system 62 of FIG. 3, is capable of patterning substrates at a much higher rate.

Referring now again to FIG. 1, if necessary or otherwise desired, alignment of the optically patterned alignment layer 107 (FIG. 2) may optionally be preserved (Block 106). For instance, polymerizing a thin layer of liquid crystal monomer (generally, several hundred nanometers thick, such as ranging from 300 nm to 500 nm) atop the patterned alignment layer 107 (FIG. 2) may be used.

Figure 5:
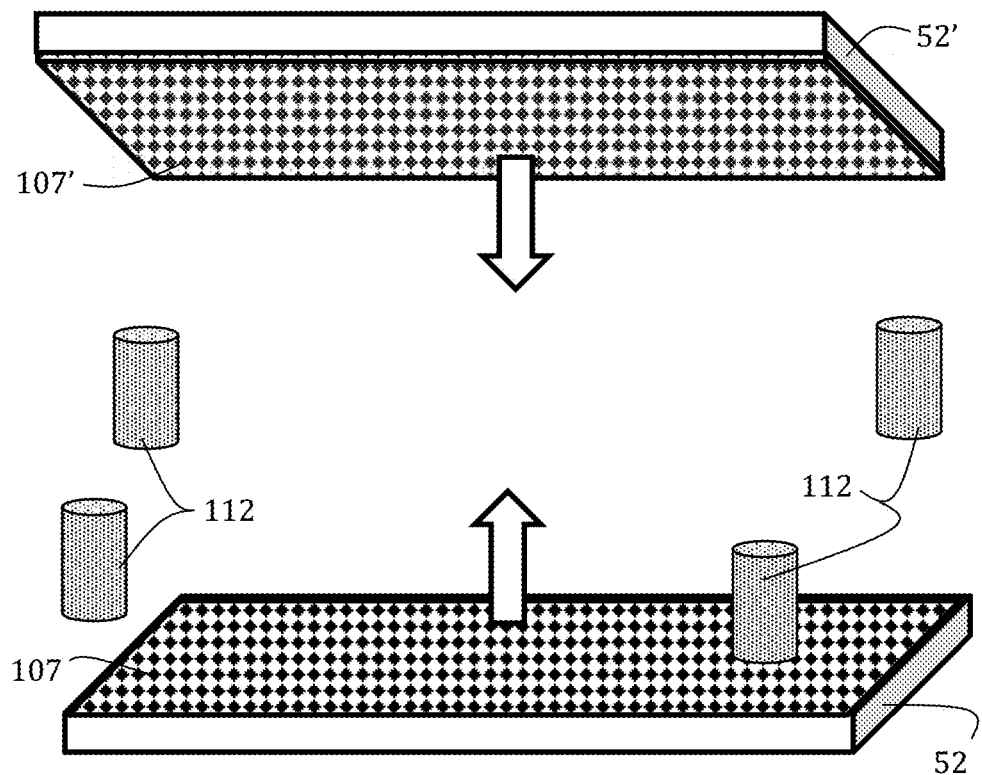
FIGS. 5 and 6 are perspective and side elevational views (in cross-section), respectively, of forming and filling a cell according to the method of FIG. 1.
Figure 6:
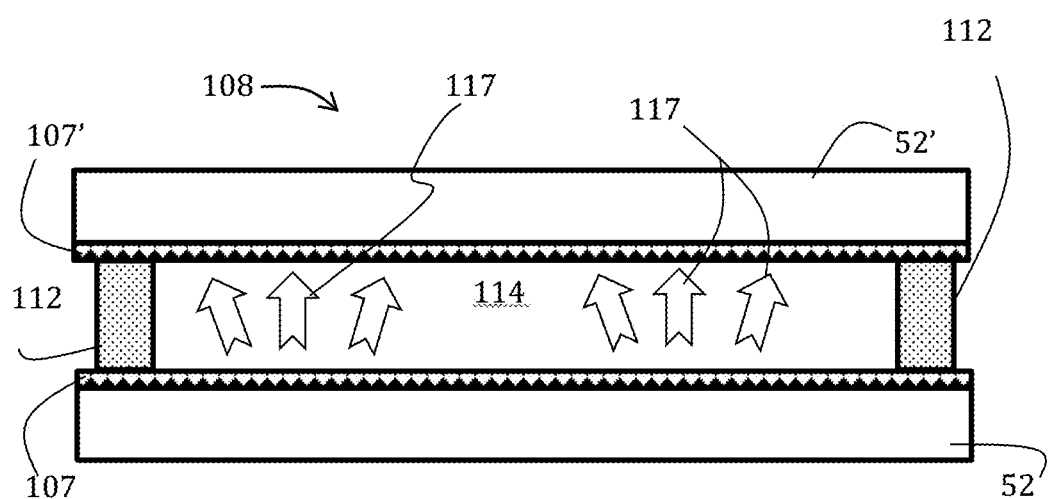

Turning now to FIGS. 5 and 6, with continued reference to FIG. 1, a liquid crystal cell 108 may then be constructed (Block 110). In that regard, prepared substrates 52, 52' may be arranged such that the patterned alignment layers 107, 107' of each are facing inwardly, separated with spacers 112, and at least partially secured and/or sealed so as to form a cavity 114 there between. Additionally, or alternatively, spacers (not shown), such as micro-sized glass spheres, may be mixed into an adhesive (for example, an epoxy) such that the layers 107, 107' may be simultaneously spaced and secured and/or sealed. Size of the spacers 112 or micro-sized glass spheres may determine the final thickness of a resultant LC film and may range generally from tens of microns to hundreds of microns, or more particularly, for example, spacers 112 having a maximum dimension of 50 μm may be used.

The cavity 114 may then be filled with a nematic mixture of liquid crystal monomers with nanotubes configured to cross-link and to reversibly shape change according to a complex programming using surface alignment in accordance with an embodiment of the present invention (Block 112).

Figure 7:
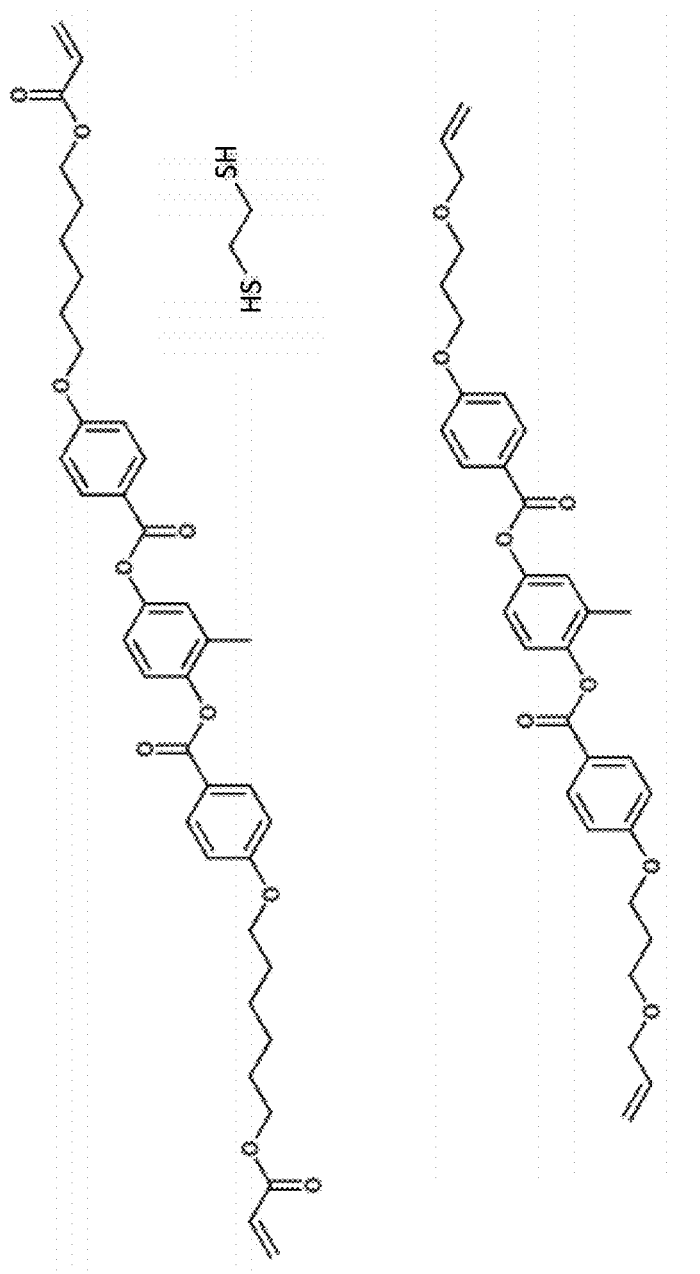
FIG. 7 illustrates exemplary monomers suitable for embodiments of the present invention.

The nematic mixture generally comprises monomers that are configured to react via free radian, chain, or step-growth mechanisms, such as those exemplary chemical compositions shown in FIG. 7. Further, these may include, for example, acrylates, methacrylates, thiols, vinyls, epoxides, amines, and others. Furthermore, monomer solutions that undergo sequential reactions may be utilized, for example, mixtures of diacrylates, amines, alkenes, and thiols. According to some embodiments of the present invention, a thiol-ene-acrylate formulation may be used as such monomers are amenable to surface alignment and sufficiently compatible with nanotubes.

The monomers may be dissolved or suspended in a solvent (for example, an organic solvent such as acetone). A solution or suspension of nanotubes may be added to the monomer solution or suspension. Suitable nanotubes include semi-conductive or conductive nanotubes comprising carbon (such as single-wall CNTs ("SWNT"), double-walled CNTs, or multi-walled CNTs), boron (boron nanotubes), or other like structures (transition metal dichalcogenide ("TMD") platelets). According to some embodiments of the present invention, SWNT are used. CNTs have a high aspect ratio (length-to-diameter) and strong π-π interactions, the latter of which may improve dispersity and interaction with LCE mesogen units. Exemplary films, without and with SWNT, are illustrated in FIGS. 8A and 8B, respectively.

Viscosities of resulting elastomers increases with increased SWNT concentration (shown in FIGS. 9A-9D). As such, the CNT content of the solution or suspension may vary, but generally CNT loading ranges from 0.02 wt % to 0.1 wt % of total material comprising the nanocomposite. Up to 1.0 wt % may be filled with the aid of vacuum.

While not required, a dispersant may be introduced to the mixture of monomers and CNTs so as to prevent or reduce aggregation of the CNTs. However, according to some embodiments of the present invention, the monomers may provide some mild dispersant activity in this regard. Sonication may also be used to aid in dispersion. CNT functionalization, including reactions with polymer grafts, may further improve dispersion.

The mixture may be heated and, optionally, sonicated or mixed so as to drive off a portion of the solvents. Additionally or alternatively, the mixture may be placed in vacuo to drive off solvents.

With the solvent removed, auxiliary chemicals may be introduced. Auxiliary chemical may include those that are configured to extend polymeric chains, are photoinitator, and so forth. Exemplary auxiliary chemicals may include, chain extenders, such as dithiols or amines. Specifically, ethanedithiol, an aliphatic dithiol, may be used to chain extend di-alkene monomers via thiol-ene click reactions. Free radical photoinitator may also be used, such as commercially available IRGACURE-651.

Optionally, and if CNTs of the mixture are unstable, aggregate, or both, the mixture may be maintained in an isotropic state until the mixture is used to fill the cavity 114 (FIG. 6).

Optionally still, the mixture may be melt-mixed a plurality of times so as to facilitate the incorporation of photoinitator, dithiols, or other auxiliary chemicals. Other methods may also be used; however melt-mixing may be preferred for small batch preparation.

Mixing may continue until the mixture appears uniform in color (oftentimes black) and without clear droplets or white or gray particulates.

Resultant SWNT-LCE nanocomposites resulting from embodiments of the present invention are configured to, and have an ability to maintain, and image, such as is shown in FIG. 10. Specifically, the image of FIG. 10 includes a 12 μm thick film of 0.02 wt % SWNT-LCE.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1—Material Preparation

Nanocomposites according to embodiments of the present invention were prepared by incorporating pristine SWNTs into a liquid crystal monomer mixture. RM82 (1,4-bis-[4-(6-acryloyloxyhexyloxy)benzoyloxy]-2-methylbenzene) and RM2AE (2-methyl-1,4-phenylene bis(4-(3-(allyloxy)propoxy)benzoate) were purchased from Synthon Chemicals (Wolfen, Germany) and were used after recrystallization from methanol. Irgacure 651 was donated by BASF (Ludwigshafen, Germany). Ethanedithiol ("EDT") was purchased from Sigma-Aldrich (St. Louis, Mo.) and used as received. Single-wall carbon nanotubes (SWNT") (length ranging from 100 nm to 1000 nm) were provided by NanoIntegris (Boisbraind, Quebec) and contained more than 95% carbon. PAAD-22 was provided by Beam Co. (Orlando, Fla.) and was diluted to 0.33 wt % in dimethylformamide before use. Elvamide was provided by DuPont (Wilmington, Deleware), and was dissolved into methanol as a 0.25 wt %/vol % solution.

RM2AE and RM82 were added at a 2:1 mol ratio to a glass vial and dissolved in warm acetone. SWNTs were loosely suspended in acetone, added to the vial, and the mixture was sonicated in a Branson ultrasonic bath for 1 hr. At all times, the mixture was shielded from fluorescent lighting. The mesogenic monomers act as a mild dispersant and prevented the SWNTs from aggregating after sonication. The mixture was then sonicated in an ultrasonic bath heated to about 95° C. to remove a majority of the solvent while keeping the SWNTs dispersed. The mixture was then placed in a vacuum chamber at 100° C. for 10 min to remove any remaining solvent. Afterward, EDT (equivalent molar to RM2AE) was added to the mixture along with 1 wt % IRGACURE 651. The mixture was melt-mixed a minimum of three times.

The SWNTs did not stay stably dispersed in the nematic state and would precipitate over the course of several hours. As such, the mixture was held in the isotropic state until filling.

The SWNTs modified a phase behavior of the monomer mixture, increasing the nematic transition temperature ($T_{NI}$) from 24° C. to 37° C. This relatively low transition temperature is most likely a result from the processing conditions.

Glass slides were initially cleaned by successive rinses in acetone and methanol, followed by a 10 min plasma cleaning treatment (Branson Ultrasonic Cleaner). To apply the photoalignment layer, PAAD solution was spin-coated onto the glass slides at 4500 RPM, and then baked at 100° C. for 10 min. To apply the Elvamide buffed alignment layer, Elvamide solution was spin-coated onto the glass slides at 4500 RPM and allowed to dry in ambient conditions. The Elvamide alignment layer was then rubbed in one direction, 30 times, with a felt cloth. Two glass slides were then glued together using UV-curable epoxy (Epofix 68) and glass spacers therebetween.

Incorporation of SWNTs led to an increase in viscosity, making it difficult to fill liquid crystal cells at loadings higher than 0.08 wt %. Images of filled cells of various loadings of SWNTs are shown in FIGS. 9A-9D. These figures are cross-polarized images of 8 μm thick, homogeneous planar LC cells filled with SWNT-LCEs with varying concentrations of SWNT (0%, 0.02%, 0.04%, and 0.08%, respecitvely). The viscosity of the mixture increased with increased SWNT loading, preventing filling of entire cell at 100° C.

The mixture was filled into liquid crystal cells via capillary action at 100° C., cooled to room temperature over 20 min., and then polymerized at room temperature under 365 nm UV light (about 150 mW/cm$^2$) for 20 min.

Alignment of the photopatterning layer was achieved by either using a vector vortex waveplate (Beam Co.) to produce a +1 defect or by using a spatial light modulator to produce pixelated patterns of linearly polarized light. In brief, the PAAD-22 photoalignment layer orients orthogonally to the polarization of the light, which then induces alignment of the liquid crystal mixture through the cell thickness.

The film was removed from the cell by soaking in deionized water for 16 hrs and then by separating the glass slides with a razor blade.

Example 2—Material Characterization

Phase transitions, birefringence, and film quality were measured using polarized optical microscopy ("POM") (Nikon) in transmission mode with temperature controlled by a Mettler Toledo HS82 heat stage. Birefringence of films was measured at a wavelength of 600 nm using a Newport 818-UV photodiode and 600 nm filter attached to the microscope. Shape change of homogenous planar films, floating on silicone oil and 5 μm glass spacers as a function of temperature, was also determined using POM.

Dynamic scanning calorimetry ("DSC") (TA Instrument Q1000) was performed under nitrogen at temperatures ranging from −40° C. to 100° C. for monomer mixtures and from −40° C. to 250° C. for cured films in hermetically sealed pans. The nematic transition determined from the peak of the heat flux trace on second cooling, and the glass transition was determined from the peak of the derivative of the heat flux trace.

Figure 11A:
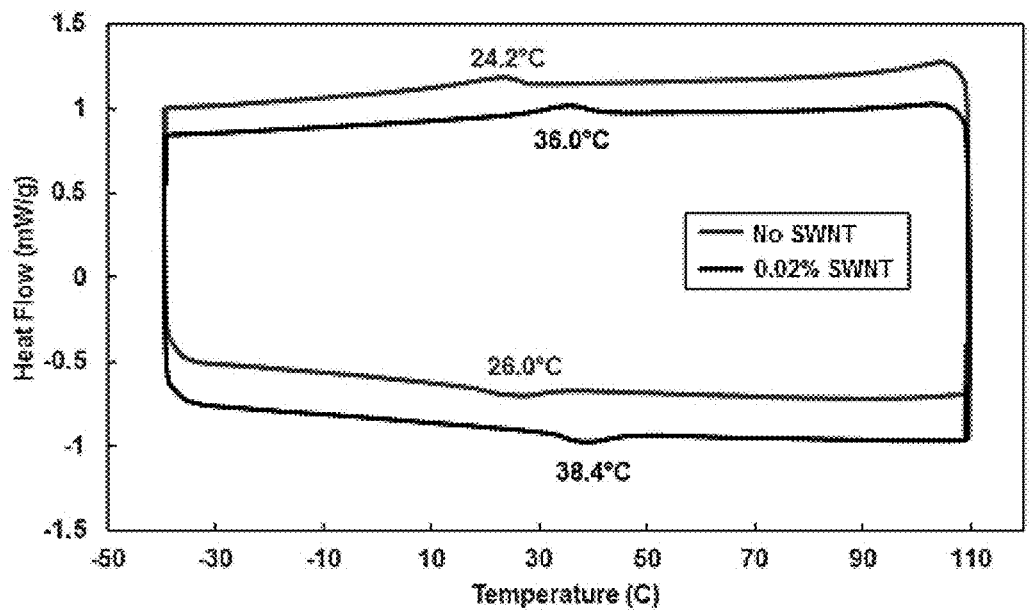
FIG. 11A is a DSC trace of monomer mixtures, with and without SWNTs, some monomer mixtures being in accordance with embodiments of the present invention.
Figure 11B:
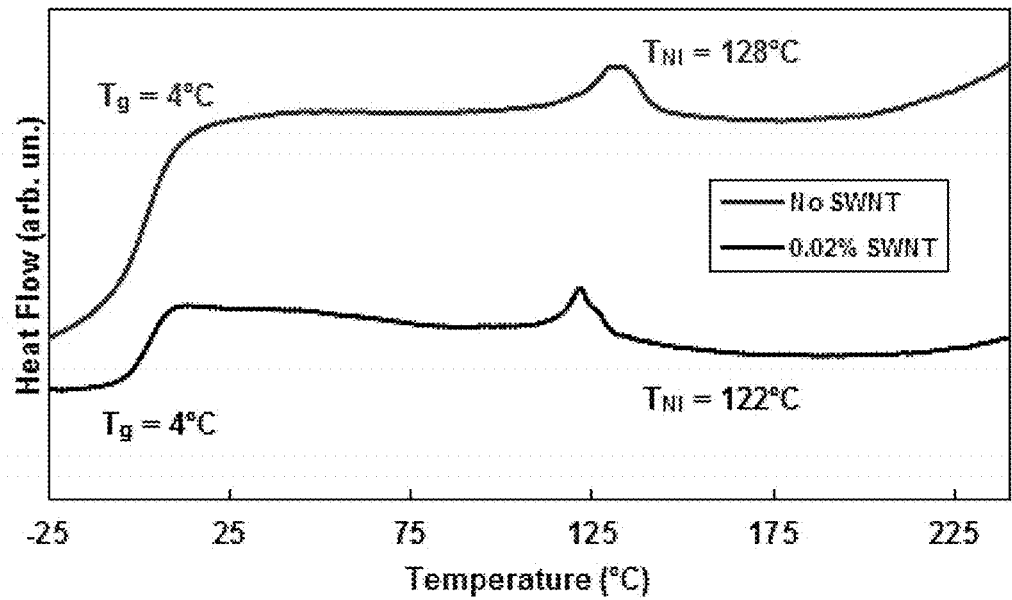
FIG. 11B is a DSC trace of a neat LCE film and a 0.02% SWNT-LCE film prepared in accordance with an embodiment of the present invention.

The LC monomers formed a stable room temperature nematic mixture having an isotropic transition at relatively low temperature. DSC traces of the monomer mixtures provided in FIGS. 11A and 11B. Traces in FIG. 11A are for the second heating and cooling. No crystallization peak was apparent to −40° C., and the nematic transition was very broad. Traces in FIG. 11B are for neat and 0.02% SWNT-LCEs. A clear transition is observed at 4° C., and a pseudo-isotropic transition is observed at 128° C. for the net LCE and 122° C. for the 0.02% SWNT-LCE.

The formulations employed here to prepare the nanocomposites were intended to generate elastomers. FIG. 11B compares DSC traces of a SWNT-LCE nanocomposite to an LCE prepared with the same composition. Both materials are elastomeric, with glass transition temperatures ($T_g$) at 4° C. The secondary transition (nematic to isotropic phase transition, $T_{NI}$) evident in the SWNT-LCE nanocomposite is suppressed by nearly 6° C. The suppression of the $T_{NI}$ is evidence for close association and intercoupling between the SWNT and the LCE host, even at very low loadings (0.02 wt %). However, despite the similarities in the baseline thermomechanical properties, the thermally-induced mechanical deformation apparently in these materials is distinguished.

Figure 12A:
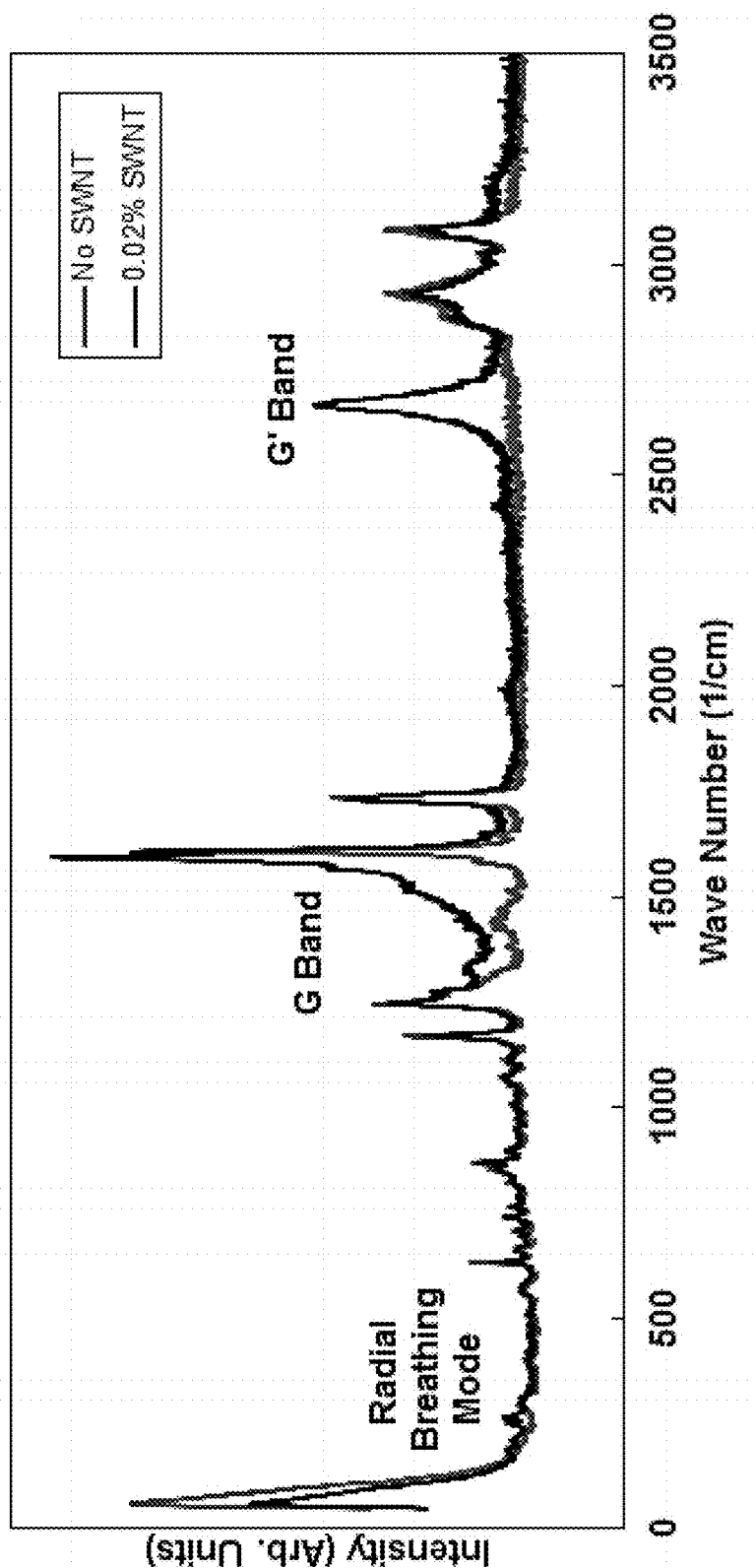
FIG. 12A is a Raman spectra of 15 μm thick films, with and without SWNTs, some films being in accordance with an embodiment of the present invention.
Figure 12B:
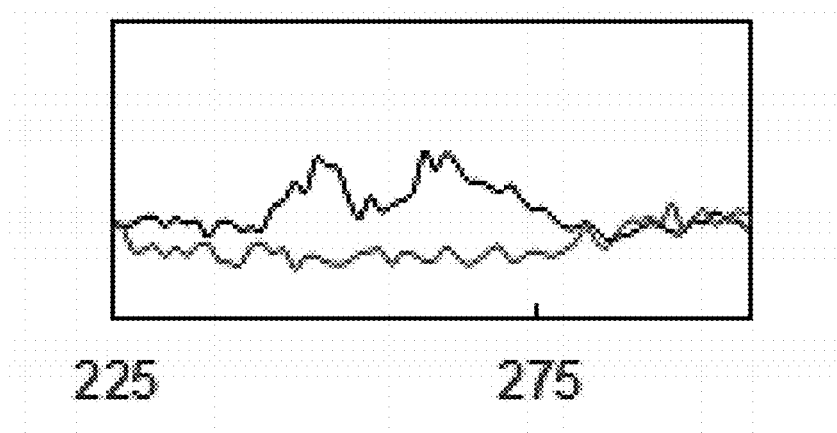
FIG. 12B is an enlarged view of the radial breathing modes of FIG. 12A.

Polarized Raman spectroscopy, shown in FIG. 12A (FIG. 12B being a close-up of Raman scatter from the radial breathing modes of the CNT), was performed on 15 μm thick samples with a Renishaw inVia confocal Raman microscope. Focused light (100× objective, 600 nm spot) from 514.5 nm and 633 nm laser excitation sources was used to excite the samples at various spots. The polarization of the incident laser was rotated every 5°, from −90° to 90° to obtain angle-dependent Raman scattering from the LCE and the SWNTs. Polarized Raman spectra were collected at various confocal depths through the thickness of the films in the case of the twisted nematic films. Order parameter for Raman spectroscopy was calculated according to conventional methods at the LCE and G' band peaks as a function of incoming laser polarization.

Figure 13:
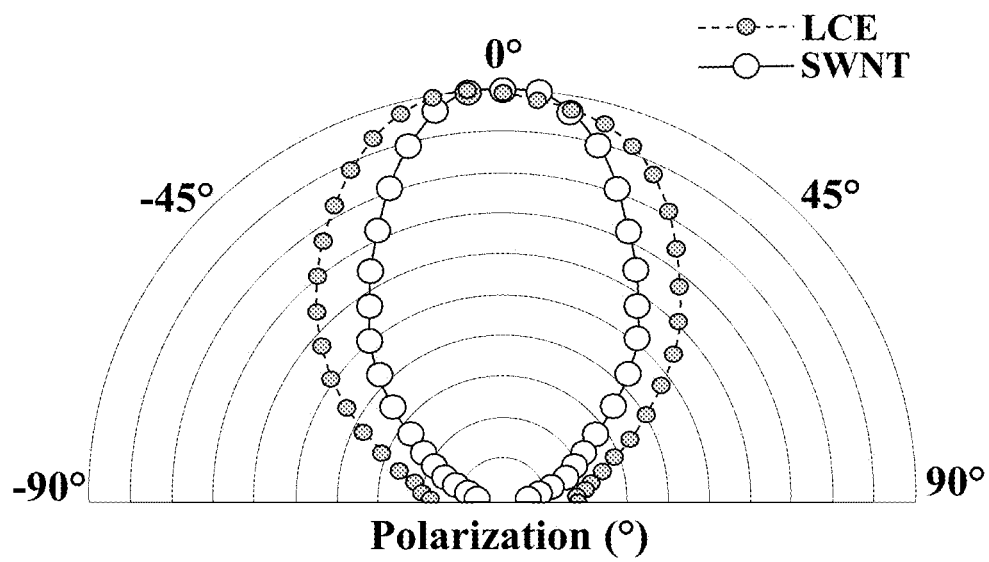
FIG. 13 graphically illustrates normalized Raman intensity as a function of polarization angle for identifiable Raman signals of LCE and SWNT in a 15 μm thick film.

SWNTs exhibit a strong Raman signal, which can enable accurate determination of orientation at very low loadings through polarized Raman measurements. The radial breathing modes (RBMs) and the G and G' bands of the SWNT are apparent in the Raman spectra in FIG. 12A. Due to overlap in the Raman signals from the G band of the SWNTs and the LCE composition, the polarization dependence of the G' band at 2670 cm$^{-1}$ was measured and is shown in FIG. 13.

The signal at 1700 cm$^{-1}$ was selected to represent LC mesogen orientation. The average orientation of the SWNT and the LC mesogen was determined by rotating the laser polarization and comparing the relative intensities of the normalized peak areas. Both the SWNT and the LC mesogens take on the surface alignment of the cell. The orientation parameter of the LC mesogens was calculated from these data to be 0.46±0.08, while the SWNT orientation was found to be slightly higher at 0.51±0.08. The orientation parameter was in good agreement with the orientation parameter for the liquid crystalline elastomers measured by wide-angle X-ray scattering (see FIGS. 14A, 14B, and 15). Notably, the orientation parameter of the LCE host (without SWNT) was nearly identical (0.46), indicating that the SWNT are not disrupting the mesogen alignment.

Figure 14:
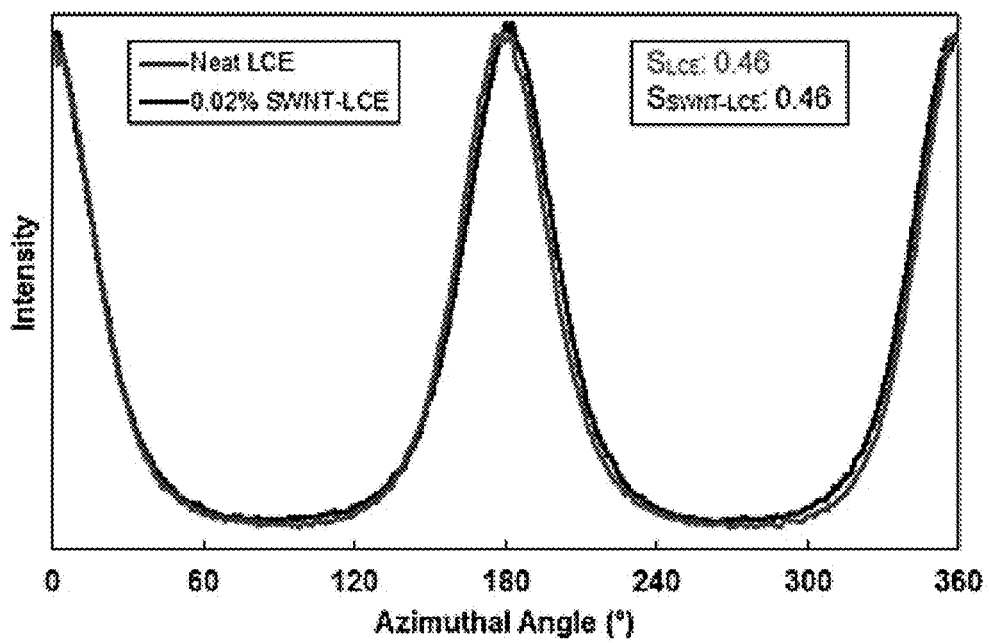
FIG. 14 graphically illustrates X-ray scattering intensity at 19.4 °2-theta peak as a function of azimuthal angle.
Figures 15A, 15B:
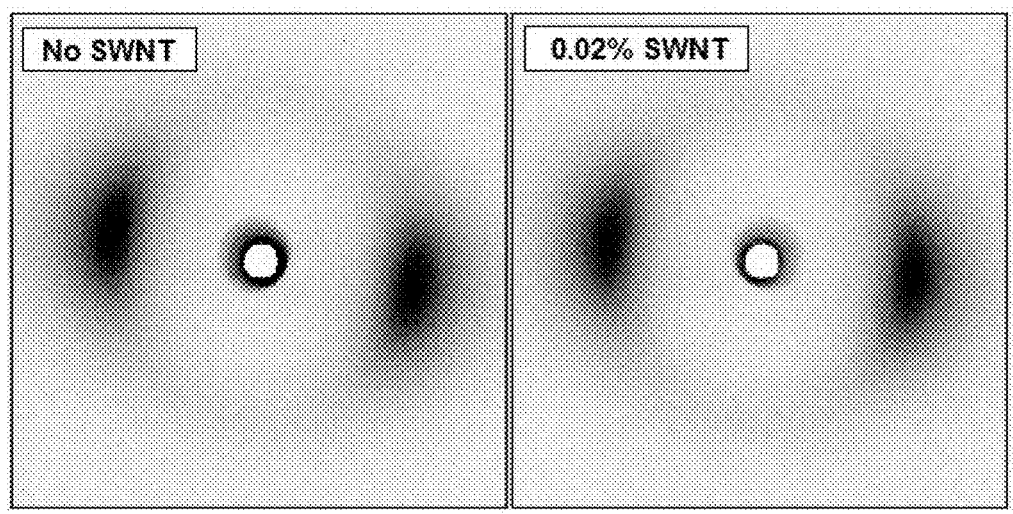
FIGS. 15A and 15B are X-ray scattering profiles of 15 μm thick film, with and without SWNTs, some films being in accordance with embodiments of the present invention.

Wide angle X-ray scattering was performed using a Rigaku Ultrax and Cu Kα radiation on a 15 μm thick sample with uniaxial alignment. Again, order parameter was calculated according to conventional methods. FIG. 14 illustrates X-ray scattering intesity at the 19.4 °2-theta peak as a function of azimuthal angle. FIGS. 15A and 15B are X-ray scattering profiles of the planar SWNT-LCEW with and without SWNT, respectively. These profiles are indicative of a well-aligned nematic system.

Figure 16A:
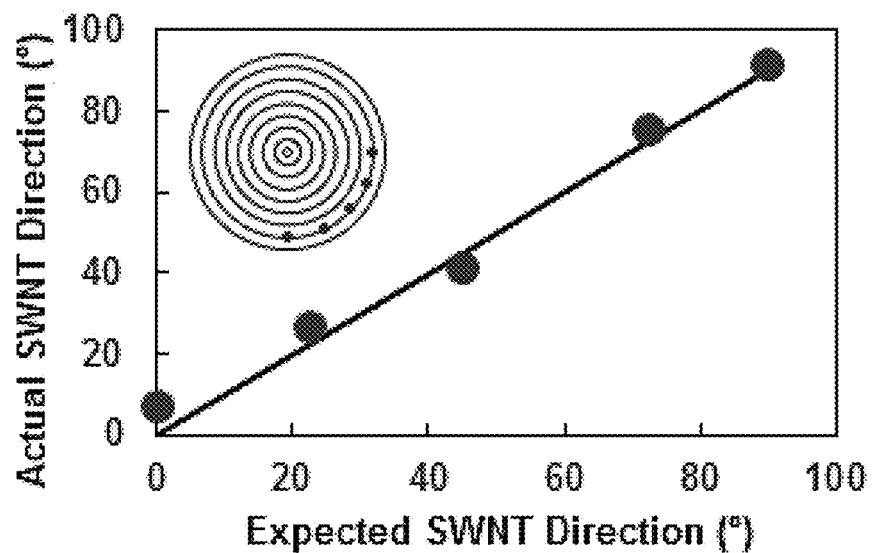
FIG. 16A graphically illustrates average orientation of SWNTs of a SWNT-LCE film having a +1 defect according to an embodiment of the present invention.
Figure 16B:
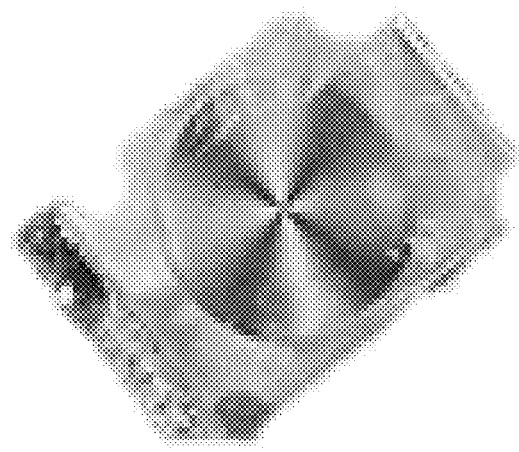
FIG. 16B illustrates the film having the +1 defect of FIG. 16A.

To confirm the association of the SWNT and LCE in more complex topologies, a +1 radial defect was imprinted into an LCE containing 0.02 wt % SWNT via a photoalignment surfaces. The SWNT orientation matched the expected director profile (FIGS. 16A and 16B). These results confirm that previously developed methods to imprint (voxelate) orientation in LCEs can be extended to arbitrarily align one-dimensional nanomaterials in a monolithic polymer matrix.

Figures 17A, 17B:
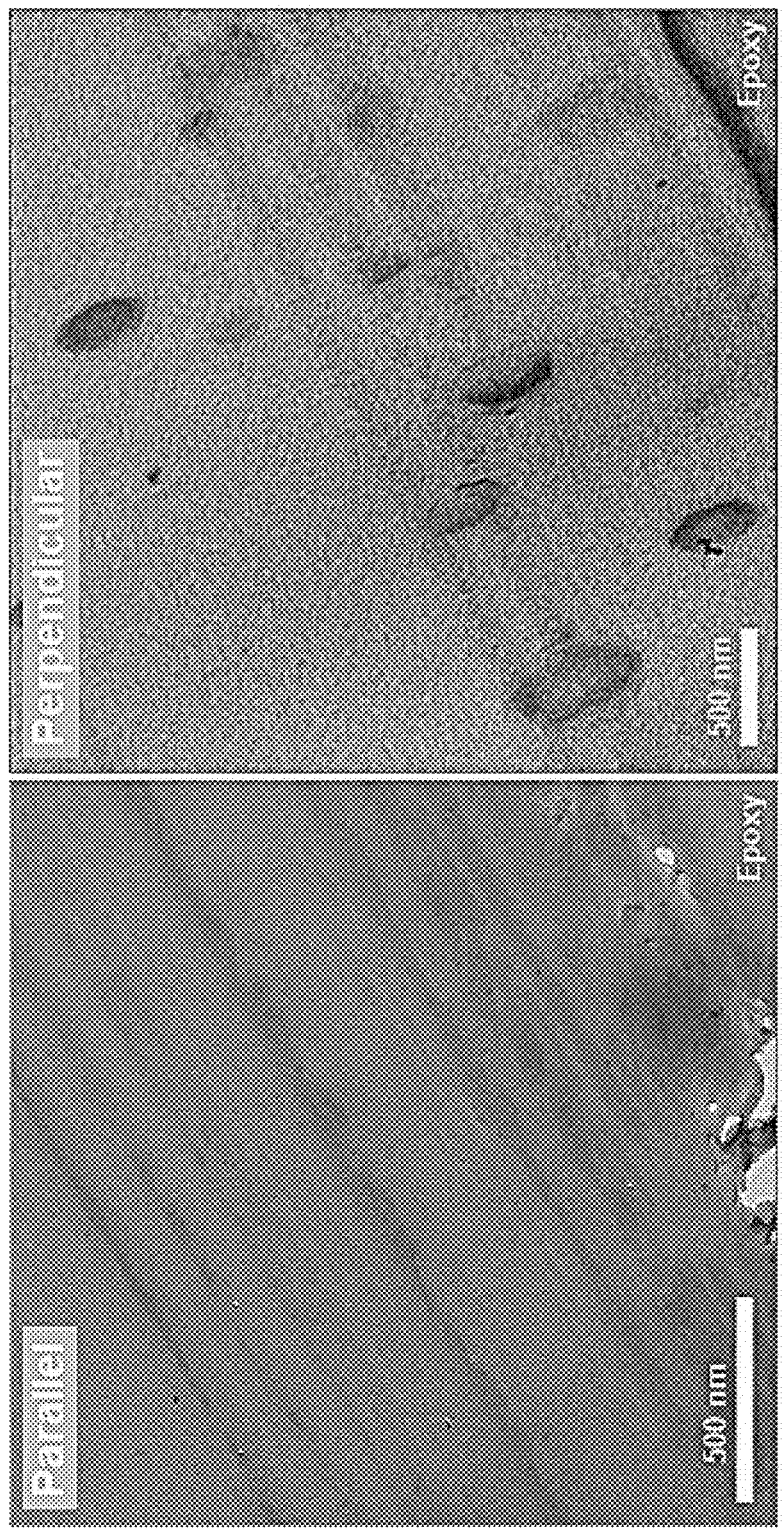
FIGS. 17A and 17B are transmission electron micrographs of a 0.02% SWNT-LCE film prepared in accordance with an embodiment of the present invention, cut parallel and perpendicular to the orientation direction, respectively.

The 0.02 wt % SWNT-LCE nanocomposite films were fixed in OsO$_4$ and embedded into flat molds with Epofix resin so that the cutting direction would be either parallel or perpendicular to the LCE/SWNT orientation direction. The blocks were polymerized overnight at 60° C. and then hand trimmed with razor blades to form a trapezoid face. The blocks were then ultramicrotomed using an RMC Ultracut microtome with a 35° Diatome diamond knife. A 75 nm thick section was collected onto a 400 hex Cu mesh grid and allowed to dry. Imaging was captured using an FEI CM 200 transmission electron microscope at 200 kV. Digital images were captured with a CCD camera and a 4Pi system. Exemplary images are provided in FIGS. 17A and 17B, for parallel and perpendicular directions, respectively.

FTIR spectra of monomer polymerization between two 1 cm thick NaCl slides were collected using a Bruker FTIR in transmission mode. Upon exposure to UV light, four scans were taken from 400 cm$^{-1}$ to 3200 cm$^{-1}$ every 0.5 sec for 30 min.

Gel fraction was performed by extraction in acetone for 24 hr and drying at 45° C. under vacuum. The gel fraction of neat LCE and SWNT-LCE sample was found to be 0.78±0.1.

Mechanical measurements were performed at 25° C. on an RSA3 TA Instruments tensile tester in uniaxial strain mode at 2% strain/min. Samples dimensions were 5 mm×2 mm×0.015 mm. All tests were performed a minimum of five times with five different samples.

Figures 18A, 18B:
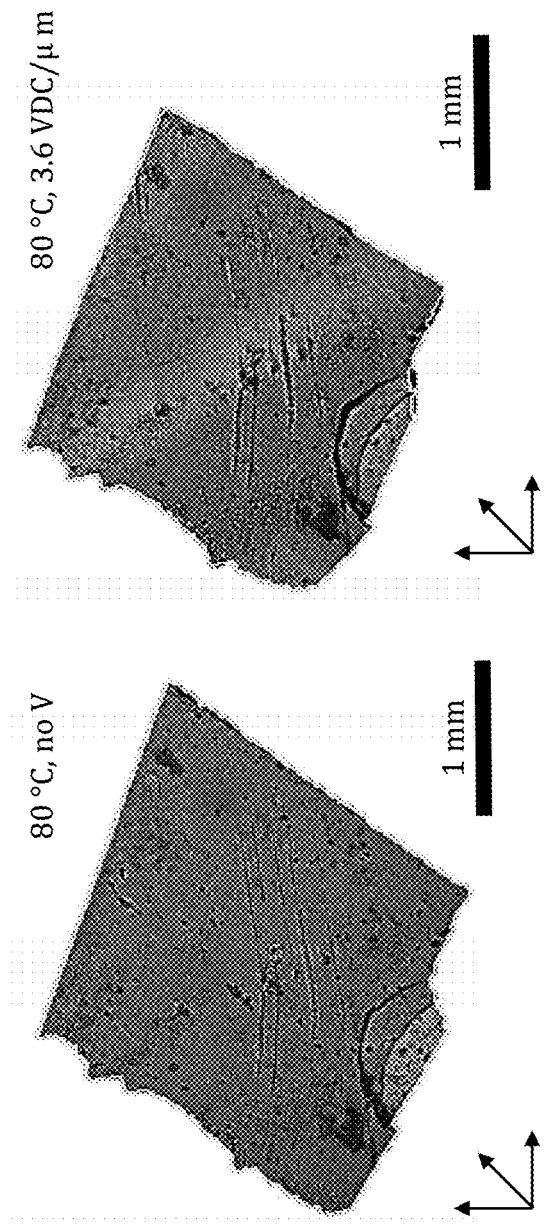
FIGS. 18A and 18B illustrate 15 μm thick films in accordance to embodiments of the present invention, floating in oil between ITO plates, and before and after exposure to an electric field.

Electromechanical measurements of homogeneous 15 μm films were imaged using POM while the film floated in silicone oil between two ITO-coated glass slides spaced 100 μm apart. Strain was determined by measuring an area of the film as a function of time using a homemade MATLAB program. The temperature was controlled using a homemade ITO heat stage and surface thermocouple. FIGS. 18A and 18B illustrate the floating film before and after, respectively, exposure to 3.6 VDC/μm electric field. The film in FIG. 18B bends along the director.

Figure 19A:
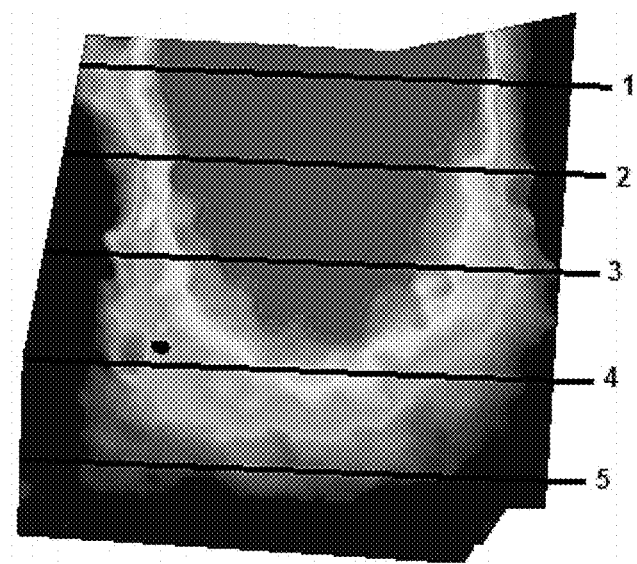
FIG. 19A is a height map difference between a 0.02% SWNT-LCE film patterned into a +1 topographical defect according to embodiments of the present invention, before and after exposure to an electric field.
Figure 19B:
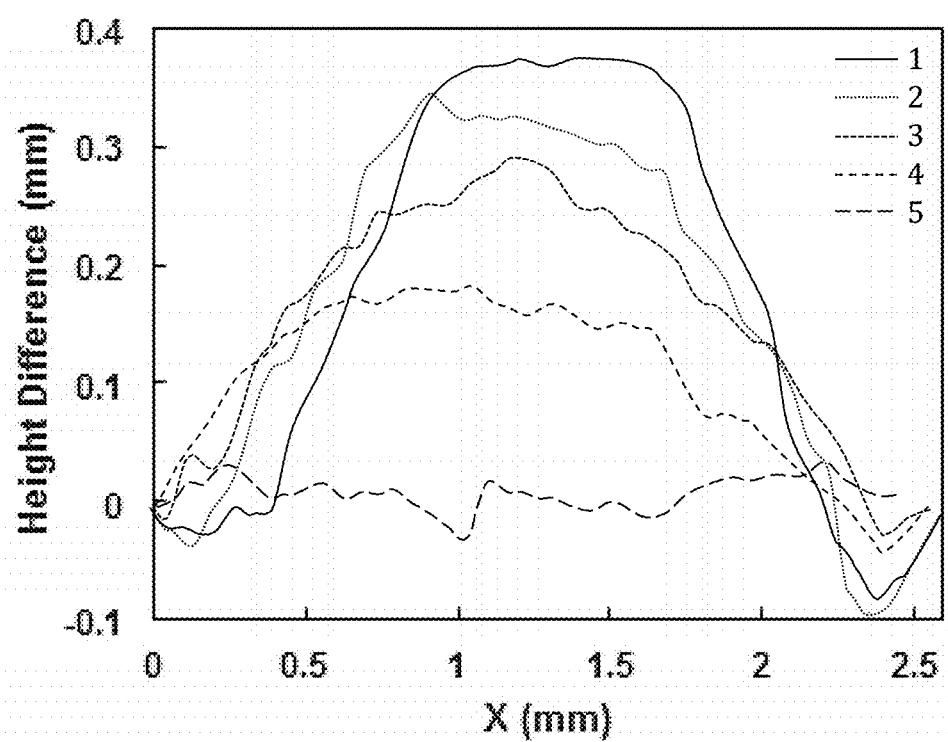
FIG. 19B graphically illustrates the height map of FIG. 19A.

FIG. 19A is an exemplary heat map of 0.02% SWNT-LCE film, patterned into a +1 topological defect. The heat map indicates significant localized shape change throughout the film during electrical activation. FIG. 19B graphically illustrates a difference in the film before and after a 1.2 VDC/Lm field applied at 90° C.

Electromechanical actuation of photopatterned films was measured using a Keyence optical profilometer 3D scanner. The 12 μm thick films, in air, were placed between ITO-coated glass slides spaced 1 mm apart, and the field applied through the film thickness. The temperature was controlled using a home-made ITO heat stage.

Electrical conductivity of 0.02 wt % SWNT-LCE films was performed in an ITO-glass liquid crystal cell with homogeneous Elvamide alignment layers. Voltage was swept from 0 V/μm to 2 V/μm in 0.1 V intervals, and the current measured after a 2 sec equilibration. The sweep was performed three times, and data reported is from the second sweep.

Dielectric impedance and permittivity measurements were conducted on ITO-glass liquid crystal cells with homogeneous Elvamide alignment layers using a Novocontrol Alpha Analyzer. The LC cells were placed inside an oven (Memmert), where temperature was ramped from 25° C. to 240° C. at a rate of 0.5° C./min. Permittivity was measured at discrete frequencies, swept over the range 0.5 Hz to 1 MHz at an AC driving voltage of 1 V; a new scan was initialized every 100 sec.

Figure 20:
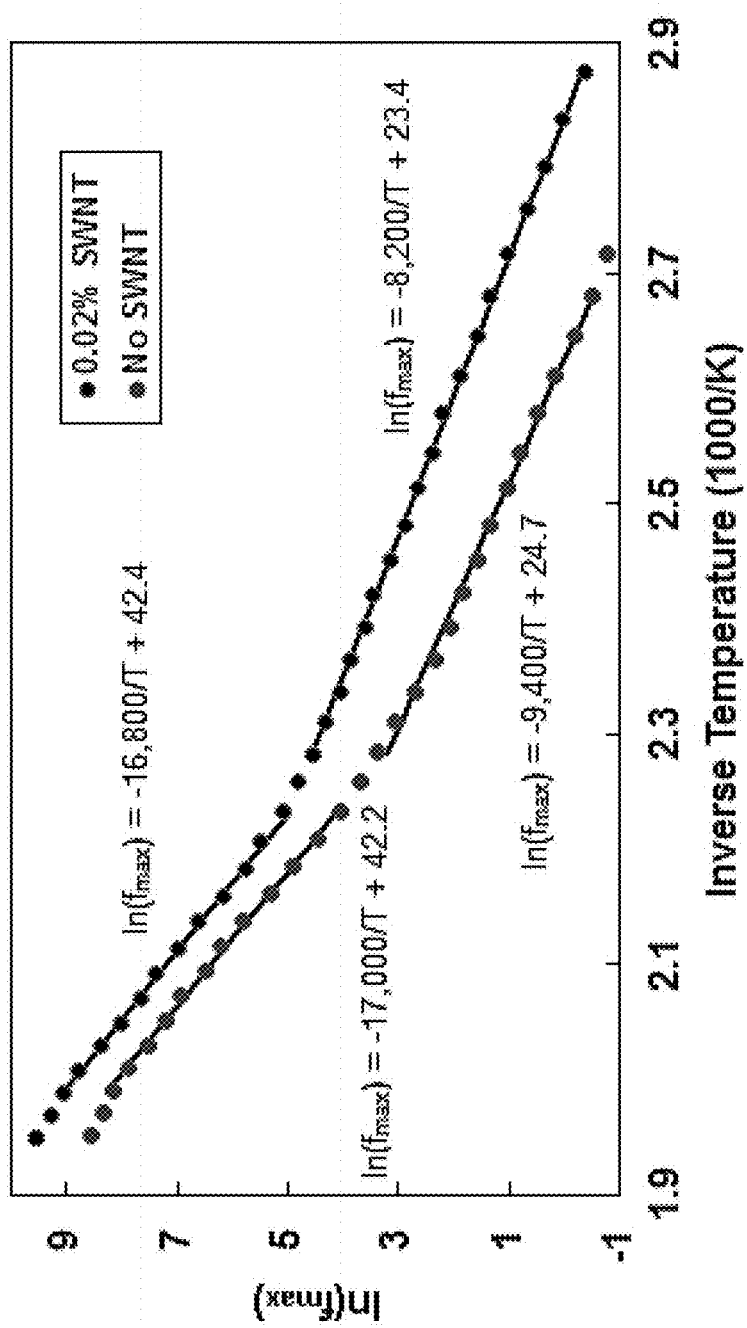
FIG. 20 graphically illustrates the relaxation peak from dielectric relaxation spectroscopy as a function of inverse temperature for films with and without SWNTS, some films being in accordance with embodiments of the present invention.

FIG. 20 graphically illustrates relaxation peak from dielectric relaxation spectroscopy as a function of inverse temperature for samples with and without SWNTs. Fitted curves were obtained for before and after the para-nematic transition temperature, and the slope was directly proportional to the dipole rotational activation energy. $E_a$=78.1 kJ/mol for films having no SWNT at low temperature. $E_a$=141.7 kJ/mol for films having no SWNT at high temp. $E_a$=66.8 kJ/mol for films having 0.02% SWNT at low temperature. $E_a$=139.5 kJ/mol for films having 0.02% SWNT at high temperature.

Figure 21A:
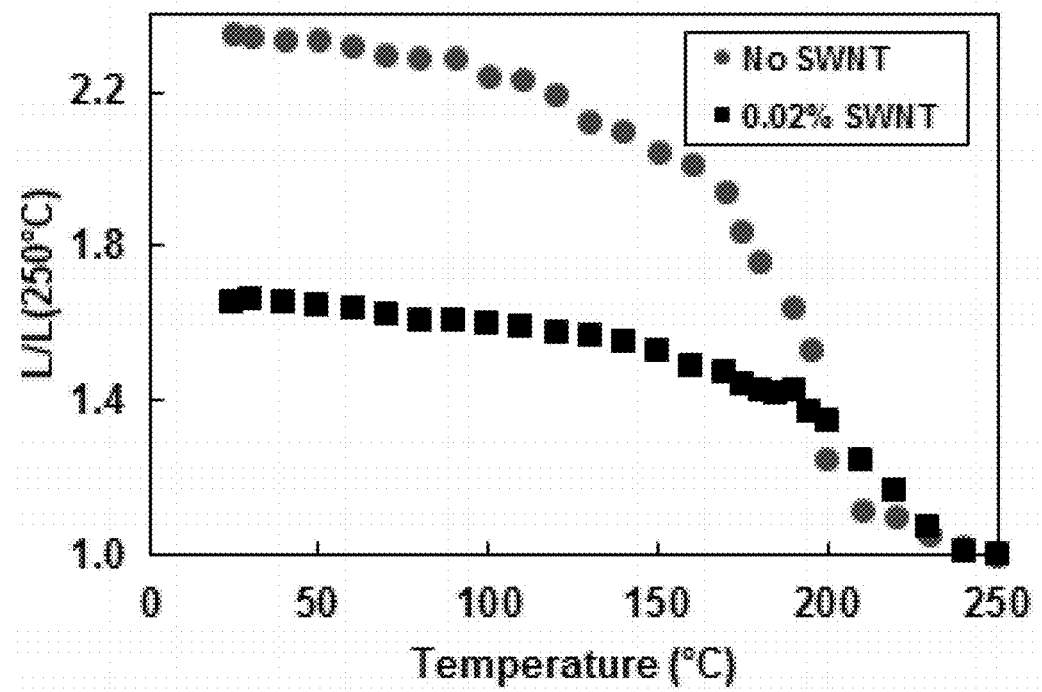
FIG. 21A graphically illustrates the shape change of films, with and without SWNTs, along the director as a function of temperature, some films being in accordance with embodiments of the present invention.
Figure 21B:
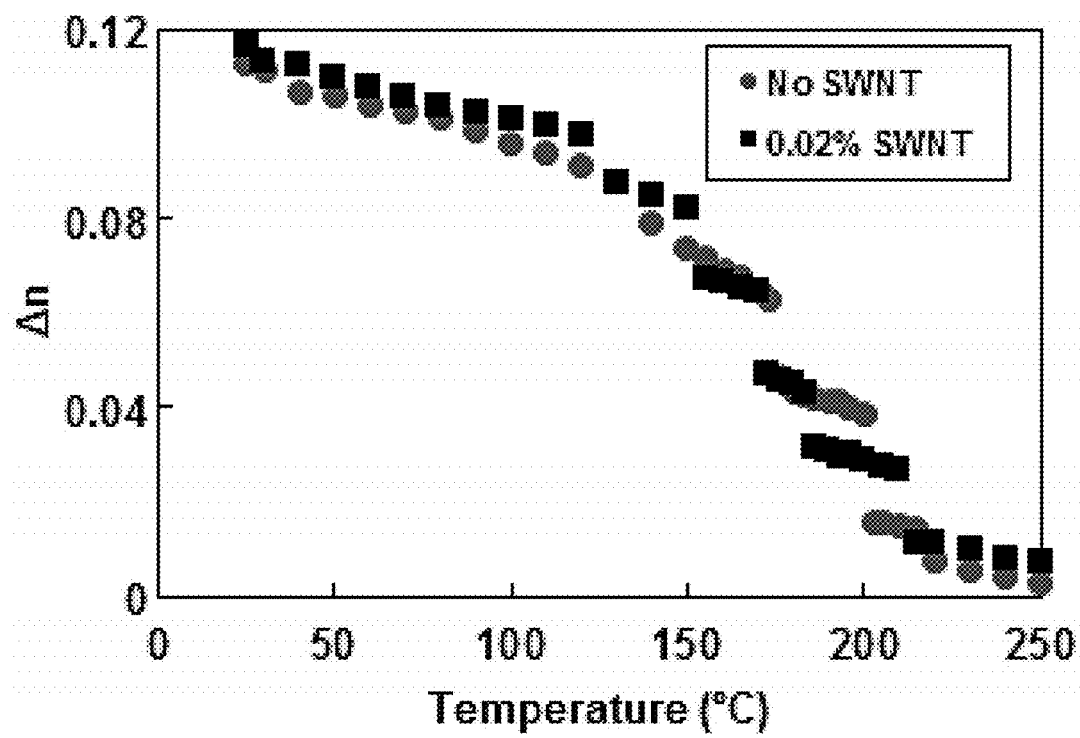
FIG. 21B graphically illustrates birefringence of films, with and without SWNTS, as a function of temperature, some films being in accordance with embodiments of the present invention.

In FIG. 21A, the incorporation of 0.02 wt % SWNT into the LCE reduces the thermally induced contraction from 140% to 60%. To clarify whether the difference is attributable to limits in thermotropic disruption of the order of the materials, the birefringence of both the neat LCE and SWNT-LCE nanocomposites were examined over a range of temperatures (FIG. 21B). The temperature dependence of the neat LCE sample and the SWNT-LCE nanocomposite are effectively identical with the exception of a small residual birefringence for the SWNT-LCE sample (FIGS. 22A and 22B).

Many conventional nanocomposites exhibit enhanced mechanical properties, such as stiffness, in part derived from anisotropy of various nanoinclusions. Deformation of the LCE in the planar orientation parallel to the director orientation exhibited classical linear stress-strain response of an elastomer. When the director orientation of the LCE is orthogonal to the stretch direction, the LCE displayed non-linear elastic behavior, known as "soft elasticity." A plateau in the stress-strain curve is associated with the rotation of the mesogens in the stress field. Evident in FIG. 23, SWNT-LCEs display a comparatively higher (and reinforced) modulus parallel to the director compared to an LCE without SWNT. There was no measurable modulus difference perpendicular to the director. The modulus increased with the inclusion of just 0.02 wt % SWNT and was about 24% (Z=5, P<0.001). However, as evident in the representative stress-strain curves presented in FIG. 23, the maximum elongation (strain to failure) of the SWNT-LCE was reduced when the director is orthogonal to the stretch direction.

Figure 24:
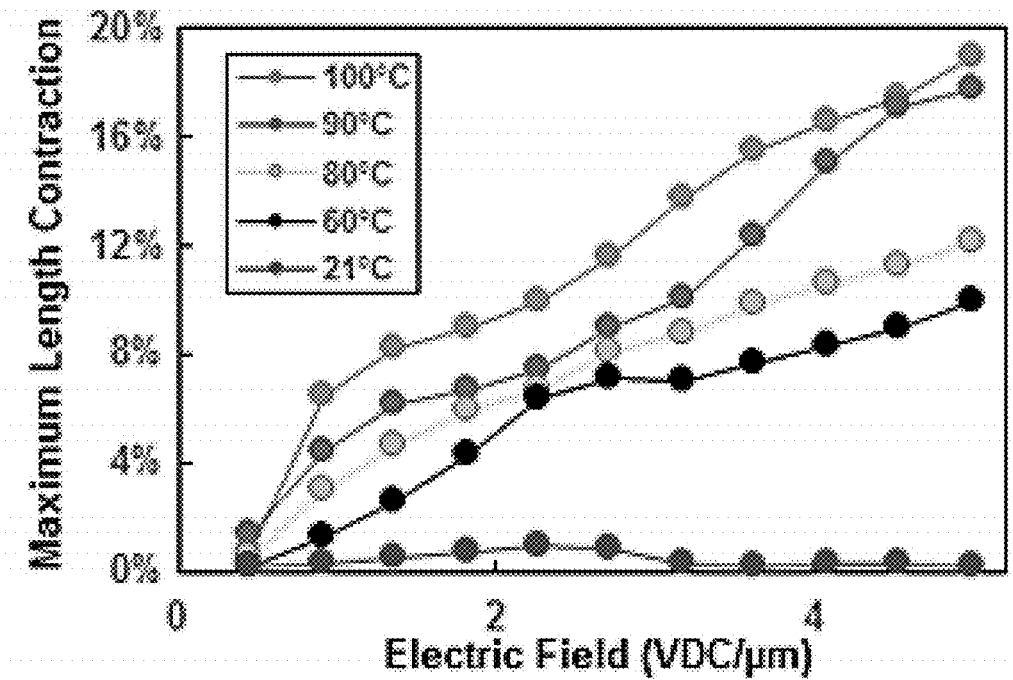
FIG. 24 graphically illustrates the relative length change along the director of a film according to the present invention at various temperatures and electric fields.

Shape change of the film was monitored between cross-polarizers. As is evident in a supporting movie available at https://pubs.acs.org/doi/suppl/10.1021/acsami.7b13814/suppl_file/am7b13814_si_002.avi, the disclosure of which is incorporated herein by reference in its entirety, the film primarily constricted along the director orientation achieving an 18% reduction in measured length at 100° C. and 5 V/μm, as shown in FIG. 24. Due to slight heterogeneity in the dispersion of SWNT across the sample thickness (TEM micrographs shown in FIGS. 17A and 17B), some bending was also observed (FIGS. 18A and 18B). The electromechanical responses reported in FIG. 24 are strongly temperature dependent. The nanocomposite prepared with this composition is not responsive to applied DC field at room temperature.

Figure 25:
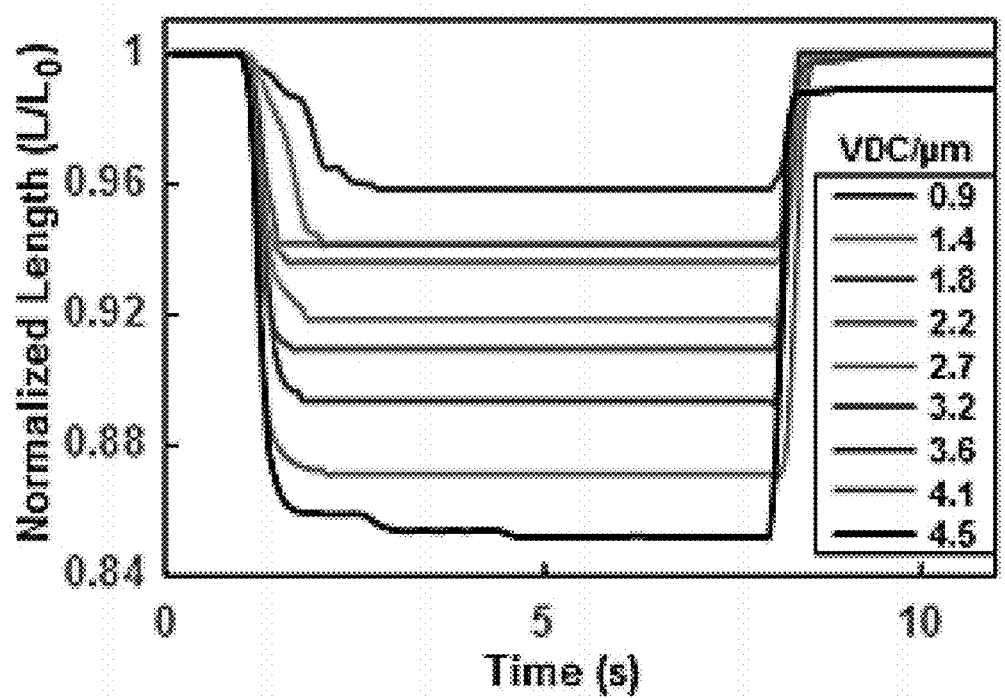
FIG. 25 graphically illustrates relative length change along the director of a film according to the present invention as a function of time at applied DC fields.
Figure 26:
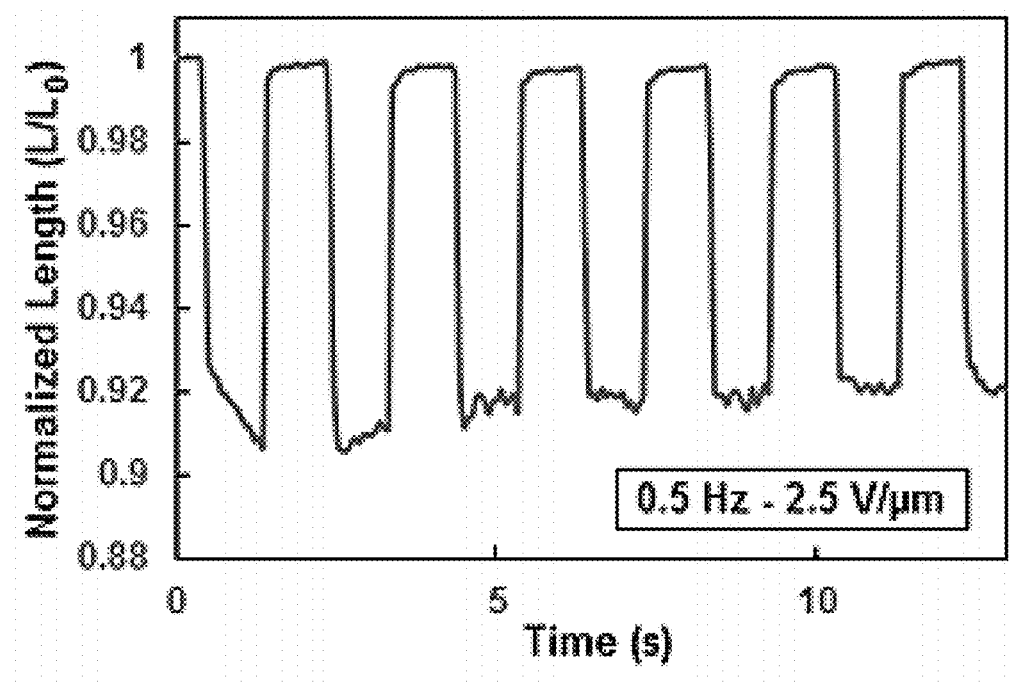
FIG. 26 graphically illustrates relative length change along the director of a film according to the present invention as a function of time in the presence of pulsed electric fields.

FIG. 25 examines the electromechanical response of the SWNT-LCE composite at 100° C. as a function of voltage. The nanocomposites constrict rapidly, reaching maximum deformation in less than one second and return to their original state quickly (less than about 1 sec) upon removing the field. This constriction and relaxation can be cycled dozens of times (FIG. 26). At extremely high fields (more than about 4.5 VDC/μm), the films showed signs of unrecoverable deformation.

Figure 27:
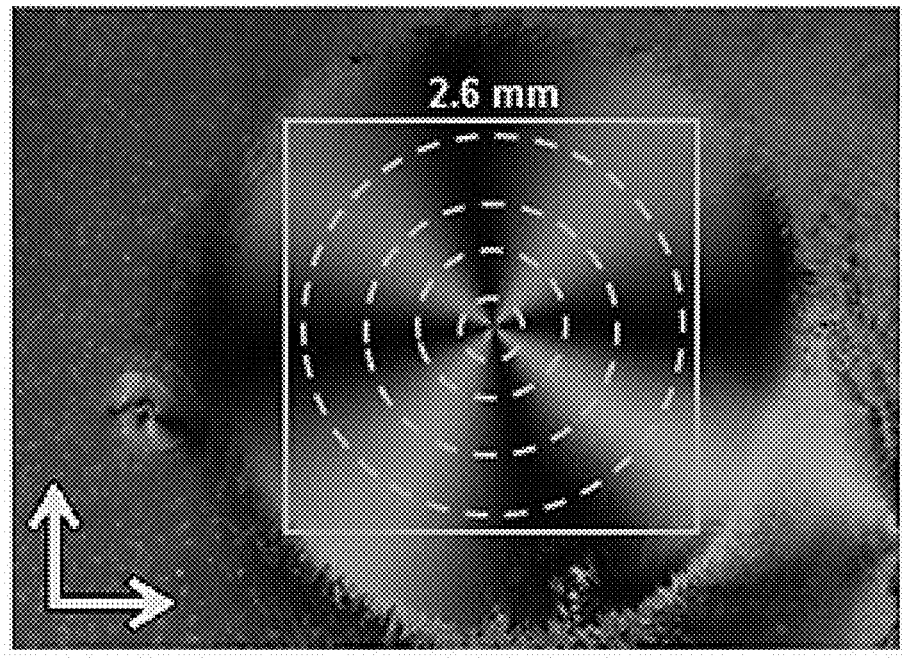
FIG. 27 is a polarized micrograph of a 12 μm 0.02 wt % SWNT-LCE film having a +1 defect in accordance with embodiments of the present invention.
Figure 28A:
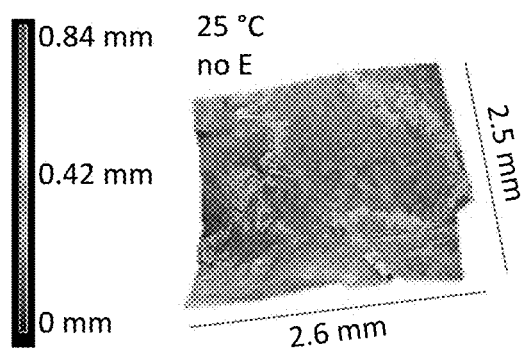
FIGS. 28A-28C are optical images of a film having topographical feature before heating (FIG. 28A), after heating (FIG. 28B), and after exposure to an electric filed (FIG. 28C).
Figure 28B:
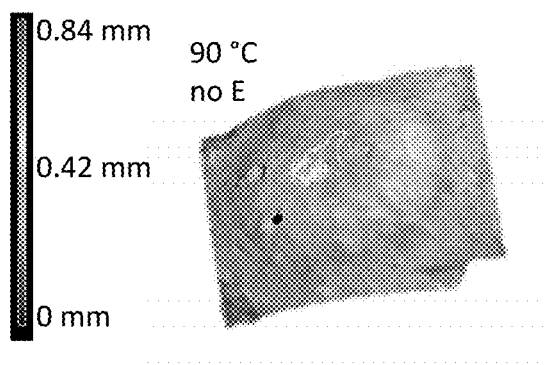
Figure 28C:
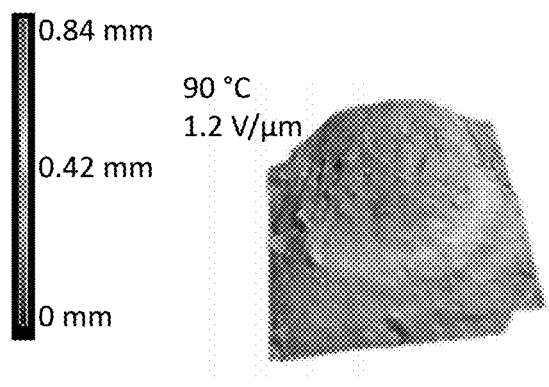

SWNT-LCE nanocomposites, photopatterned such that the director field is a +1 radial defect (FIGS. 27 and 28A), were then placed in a 1 mm thick, ITO cell to simulate free-standing actuation without the need for flexible electrodes or electrical contacts. Upon heating to 90° C., the films began to form a very shallow cone (FIG. 28B). At this temperature, a 1.5 V DC/μm field was applied to electrically induce a rapid shape deformation (FIG. 28C). The new shape appeared to be a cone-like shape but with some asymmetry (FIGS. 28A and 28B). When the field was released, the film quickly returned to the shallow cone evident in FIG. 28B. As such, a DC electric field was shown to generate a complex and curved shape. This shape change is smoothly varying across the film (FIG. 19B). It is not yet clear why the electromechanical deformation does not form a cone that is apparent in thermal experiments.

While not wishing to be bound by theory, it is hypothesized that the observed electromechanical response may be attributable to a combination of rotation of the SWNT ascribed to dielectric mismatch between the SWNT and the LCE and mesogen rotation via interfacial polarization between the nanoinclusions and the LCE. The possibility of electro-thermal induced effect may be dismissed because deformation and recovery of the SWNT-LCE films occurs in less than 1 sec (resistive heating responses are transient and comparatively slow). Moreover, resistive heating may be induced by either AC or DC field; the SWNT-LCE films were responsive only to low frequency AC fields. Such nature of the electric field susceptibility of the SWNT-LCE indicates that the interface of the SWNT and the LCE host may be critical.

Figure 29:
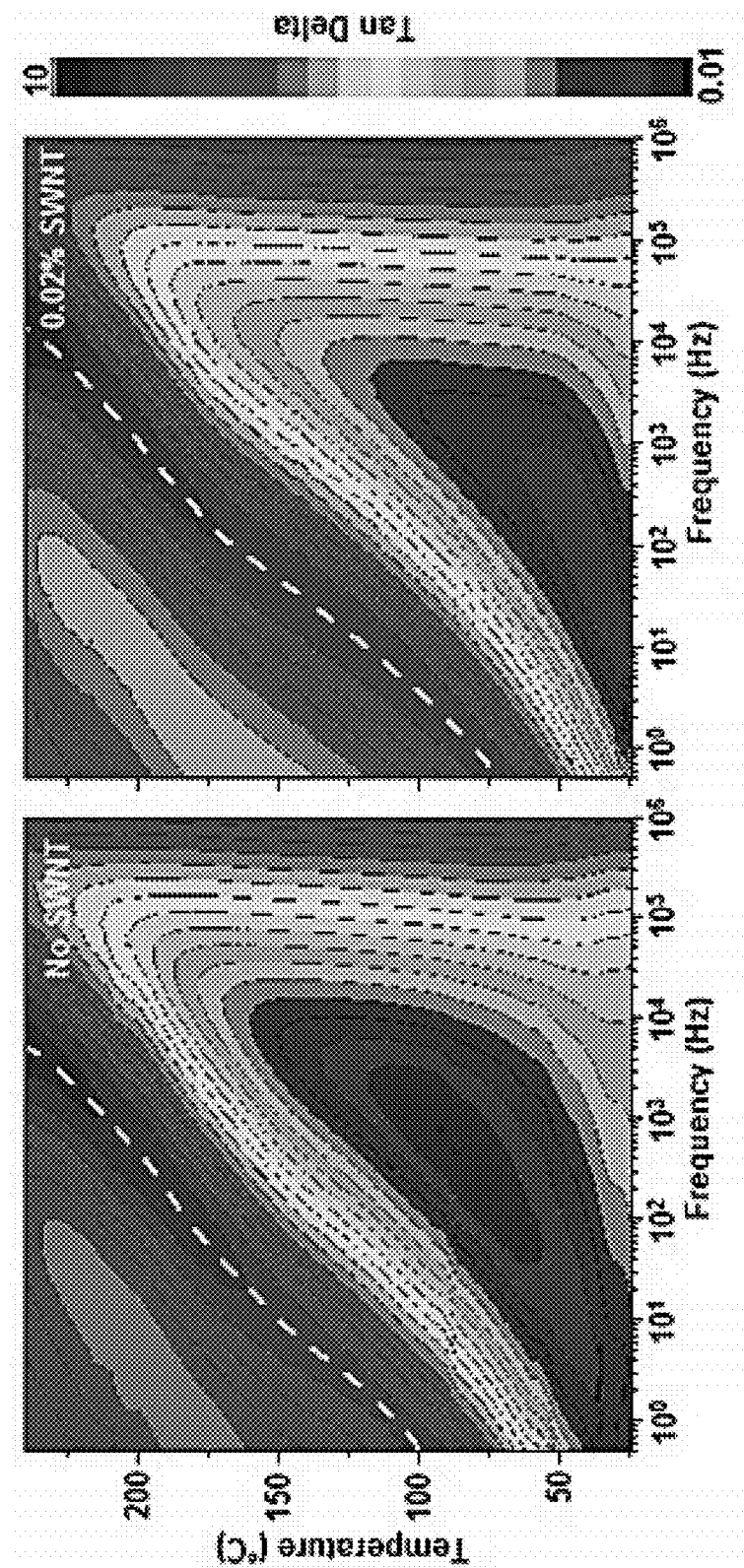
FIG. 29 graphically illustrates loss tangent as a function of frequency and temperature of films, with and without SWNTs, some films being in accordance with embodiments of the present invention.
Figure 30:
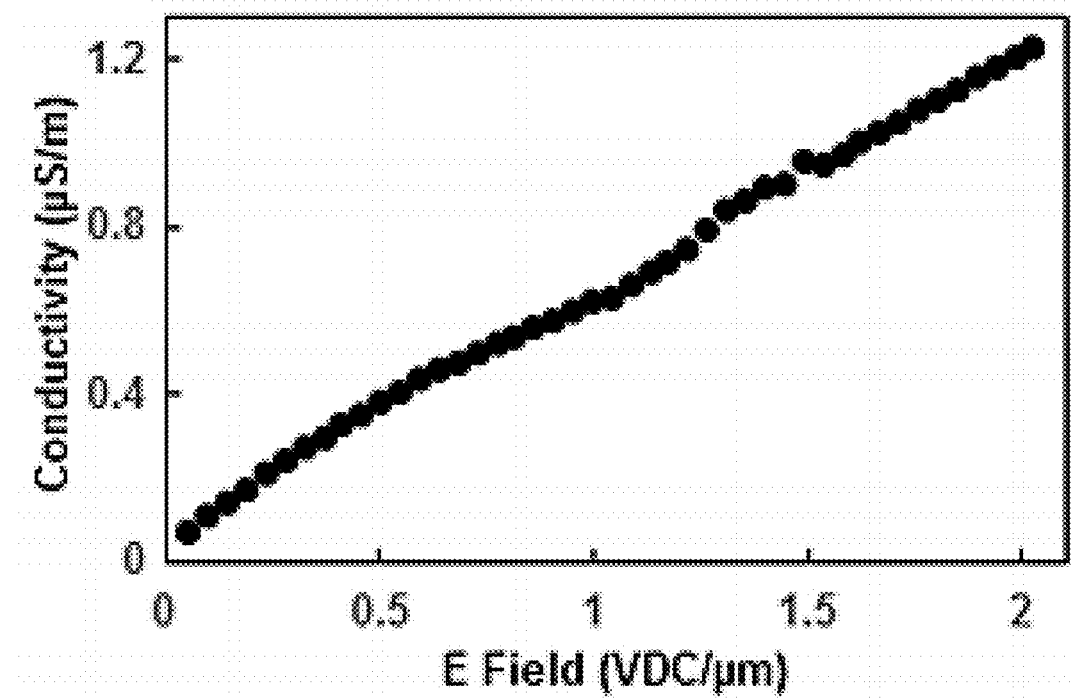
FIG. 30 graphically illustrates the stead-state electrical conductivity as a function of DC voltage for a film in accordance with an embodiment of the present invention.

To further explore the electrical properties of these materials, dielectric relaxation spectroscopy ("DRS") was used to determine whether LCE dipoles rotated more freely in the electric field in the presence of SWNT. Neat LCE displayed no dipole relaxation from 0.5 Hz to $10^6$ Hz until heated above 100° C. In contrast, SWNT-LCE films displayed a strong dipole relaxation in the same frequency range by 65° C. (FIG. 29). At all measured temperatures, the SWNT-LCE dipole relaxation occurred at a much higher frequency than in the neat LCE film. This suggests that the LCE dipoles experience much less resistance to motion in an electric field and are able to relax faster. The permittivity of a dielectric material is increased both from the dipole rotation, which effectively screens the field, and from additional free surface charge accumulation. From 50° C. to 150° C., the permittivity of the SWNT-LCE is much greater than the permittivity of the neat LCE, which indicates a significant increase in either dipole mobility, charge accumulation, or both (FIG. 30).

Dipole rotational activation energy may be determined from the relaxation peak as a function of temperature (FIG. 20). SWNTs lowered the dipole rotational activation energy by 15% when the material was below the $T_{NI}$.

Figure 31:
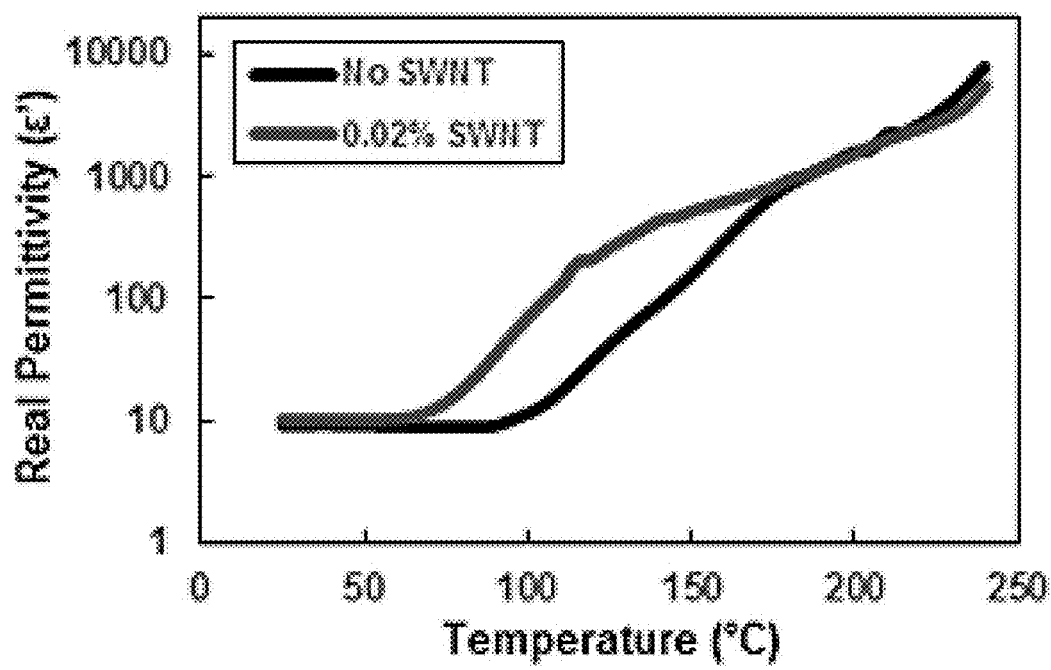
FIG. 31 graphically illustrates real permittivity at 1 Hz as a function of temperature for films, with and without SWNTs, some films being in accordance with embodiments of the present invention.

To determine whether the SWNTs were reorienting in the electric field, electrical conductivity through film thickness was measured as a function of field strength. Evident in FIG. 31, the SWNT-LCE films displayed highly non-Ohmic conductivity and increased conductivity with increasing DC electric field. At high field strength, the SWNT-LCE film became modestly semiconductive (less than 1.2 µS/m at 2 VDC/µm), which suggests SWNT orientation changes with increasing field strength. The material relaxed when the field was removed, becoming insulating again at low voltages. It is likely that rotation of the SWNTs is not solely responsible for the electromechanical responses, but it may play a complementary role that is potentially attributable to interfacial charge accumulation and which synergistically produce a strong electrostrictive force.

According to the various embodiments, liquid crystal elastomers that retain the order of their liquid crystalline precursors are described herein. These liquid crystal elastomers undergo large, reversible deformations in response to electricity. According to some embodiments, the liquid crystal elastomers may also under go large, reversible deformations in response to one or more of heat, light, and solvent. Such liquid crystal elastomers could enable easier device integration and swifter response times.

Preparation of liquid crystal elastomers responsive to electricity according to various embodiments are described herein. Some exemplary embodiments are characterized. The liquid crystal elastomers comprise nanocomposites having CNTs dispersed into the liquid crystal elastomer matrix such that the CNTs align with an orientation of the liquid crystalline director. Accordingly, these nanocomposites are arbitrarily and complexly aligned, with local control of both the liquid crystalline director as well as the orientation of the CNTs. Due to the interfacial interactions of the SWNTs with the polymer host, these nanocomposites exhibit distinctive electrically-induced shape transformation.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A shape-programmable liquid crystal elastomer comprising:
   cross-linked and polymerized nematic, isotropic monomers with nanotubes organized into a plurality of voxels, each voxel of the plurality having a director orientation such that each voxel of the plurality has a first state according to the director orientation and a second state according to cross-linkages of the polymerized nematic monomers,
   wherein the elastomer transitions between the first and second states with exposure to an electric field, and a nanotube content ranges from 0.02 wt % to 1.0 wt %.

2. The shape-programmable liquid crystal elastomer of claim 1, wherein the nanotubes are carbon nanotubes, boron nanotubes, or TMD platelets.

3. The shape-programmable liquid crystal elastomer of claim 1, wherein the nanotubes are single-wall carbon nanotubes, double-walled carbon nanotubes, multi-walled carbon nanotubes, or combinations thereof.

4. The shape-programmable liquid crystal elastomer of claim 1, further comprising:
   an auxiliary chemical.

5. The shape-programmable liquid crystal elastomer of claim 4, wherein the auxiliary chemical is a photoinitiator, a chain extender or both.

6. The shape-programmable liquid crystal elastomer of claim 5, wherein the photoinitator is IRGACURE-651.

7. The shape-programmable liquid crystal elastomer of claim 5, wherein the chain extender is an ethanedithiol, an aliphatic dithiol, or an amine.

8. The shape-programmable liquid crystal elastomer of claim 1, wherein the nematic monomers are selected from the group consisting of acrylates, methacrylates, thiols, vinyl, epoxides, and amines.

9. The shape-programmable liquid crystal elastomer of claim 1, wherein the nematic monomers include a ratio mixture of a diacrylate and an amine.

10. The shape-programmable liquid crystal elastomer of claim 9, wherein the diacrylate is 1,4-bis-[4-(6-acryloxyloxyhexyloxy)benzoyloxy]-2-methylbenzene and the amine is n-butyl amine.

11. The shape-programmable liquid crystal elastomer of claim 1, wherein the polymerized nematic monomers a mesogen.

12. The shape-programmable liquid crystal elastomer of claim 1, further comprising:
   a domain comprising adjacent voxels of the plurality having similar director orientation.

13. The shape-programmable liquid crystal elastomer of claim 1, wherein each voxel of the plurality has a length dimension, a width dimension, and a depth dimension.

14. The shape-programmable liquid crystal elastomer of claim 1, wherein the polymerized, nematic monomer is polymerized diacrylate functionalized azobenzene.

15. The shape-programmable liquid crystal elastomer of claim 1, wherein the elastomer exhibits a nonlinear elastic behavior.

* * * * *